(12) United States Patent  
Sakakibara et al.

(10) Patent No.: US 9,363,396 B2  
(45) Date of Patent: Jun. 7, 2016

(54) IMAGE READING DEVICE

(71) Applicant: BROTHER KOGYO KABUSHIKI KAISHA, Nagoya-shi, Aichi-ken (JP)

(72) Inventors: Arisa Sakakibara, Nagoya (JP); Takayuki Akimatsu, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 3 days.

(21) Appl. No.: 14/227,755

(22) Filed: Mar. 27, 2014

(65) Prior Publication Data

US 2015/0092255 A1    Apr. 2, 2015

(30) Foreign Application Priority Data

Sep. 27, 2013 (JP) ................................. 2013-202506

(51) Int. Cl.
*H04N 1/04* (2006.01)
*H04N 1/00* (2006.01)

(52) U.S. Cl.
CPC ....... *H04N 1/00559* (2013.01); *H04N 1/00551* (2013.01); *H04N 1/00599* (2013.01)

(58) Field of Classification Search
CPC .................. H04N 1/00551; H04N 1/00599
See application file for complete search history.

(56) References Cited

U.S. PATENT DOCUMENTS

| 5,534,989 | A * | 7/1996 | Rubscha | G03G 15/60 271/186 |
|---|---|---|---|---|
| 6,830,401 | B1 * | 12/2004 | Hwang | B41J 13/106 347/104 |
| 2002/0056957 | A1 | 5/2002 | Sekine | |
| 2005/0104280 | A1 * | 5/2005 | Wong | B65H 1/04 271/162 |
| 2010/0252987 | A1 | 10/2010 | Furuyama et al. | |
| 2012/0043714 | A1 * | 2/2012 | Hamaguchi et al. | 271/10.09 |
| 2012/0049438 | A1 * | 3/2012 | Akimatsu et al. | 271/121 |
| 2012/0155941 | A1 * | 6/2012 | Kozaki | H04N 1/00525 399/367 |
| 2012/0274994 | A1 * | 11/2012 | Westcott | H04N 1/0464 358/498 |
| 2013/0044174 | A1 * | 2/2013 | Takemura | B41J 29/13 347/108 |
| 2013/0170001 | A1 * | 7/2013 | Takahata | H04N 1/00588 358/498 |
| 2015/0015927 | A1 * | 1/2015 | Fujiwara | 358/498 |

FOREIGN PATENT DOCUMENTS

| JP | 2002-145457 A | 5/2002 |
|---|---|---|
| JP | 2010-245624 A | 10/2010 |

\* cited by examiner

*Primary Examiner* — Cheukfan Lee
(74) *Attorney, Agent, or Firm* — Merchant & Gould P.C.

(57) ABSTRACT

An image reading device includes a support portion having a cover surface and an opposing first support surface, the support portion pivotable between open and closed positions, wherein in the closed position, the cover surface is an upper cover of the image reading device. The image reading device further includes a second support portion pivotable between open and closed positions, wherein in the closed position, the second support portion is positioned below the support portion.

16 Claims, 16 Drawing Sheets

IMAGE READING DEVICE

CROSS-REFERENCE TO RELATED APPLICATION

This application claims priority from Japanese Patent Application No. 2013-202506, filed on Sep. 27, 2013, which is incorporated herein by reference in its entirety.

TECHNICAL FIELD

Aspects disclosed herein relate to an image reading device.

BACKGROUND

A known automatic-document-feeder ("ADF") type image reading device reads an image from a document while conveying the document.

The image reading device includes a sheet feed tray, on which one or more sheets to be fed from a sheet inlet are placed, and a sheet discharge tray, on which the one or more sheets to be discharged from a sheet outlet are placed. The sheet feed tray is allowed to be opened and closed to be located at a position where the sheet feed tray exposes the sheet inlet and at a position where the sheet feed tray covers the sheet inlet, selectively. The sheet discharge tray is allowed to be opened and closed to be located at a position where the sheet discharge tray exposes the sheet outlet and at a position where the sheet discharge tray covers the sheet outlet, selectively. The sheet discharge tray is configured to move from the position where the sheet discharge tray exposes the sheet outlet to the position where the sheet discharge tray covers the sheet outlet in synchronization with the movement of the sheet feed tray from the position where the sheet feed tray exposes the sheet inlet to the position where the sheet feed tray covers the sheet inlet.

SUMMARY

Some embodiments of the present disclosure provide for an image reading device comprising a housing defining a conveying path; a reading unit positioned along the conveying path; a first support portion; and second support portion. In this embodiment, the first support portion is positioned at a first end of the conveying path; wherein the second support portion is positioned at a second end of the conveying path opposite the first end; and wherein the second support portion comprises first and second surfaces, the first and second surfaces positioned opposite to each other. Additionally, in the first and second support portions are pivotable together between first and second positions thereby maintaining a relative orientation of the first and second support portions, wherein in the first position the first support portion and the first surface are sheet support surfaces, and in the second position the second surface is an upper cover of the image reading device.

In another embodiment, an image reading device is disclosed, wherein the image reading device comprises a housing defining a conveying path; a reading unit positioned along the conveying path; and a support portion having a cover surface and an opposing first support surface, the support portion pivotable between open and closed positions about an axis orthogonal to a conveying direction, wherein in the closed position, the cover surface is an upper cover of the image reading device. In this embodiment, a second support portion is pivotable between open and closed positions in the same direction as the first support surface; and wherein in the closed position, the second support portion is positioned below the support portion.

DESCRIPTION OF THE DRAWINGS

For a more complete understanding of the present disclosure, needs satisfied thereby, and the objects, features, and advantages thereof, reference now is made to the following descriptions taken in connection with the accompanying drawings.

DETAILED DESCRIPTION

Illustrative embodiments are described in detail with reference to the accompanying drawings.

<Overall Configuration>

Figure 1:
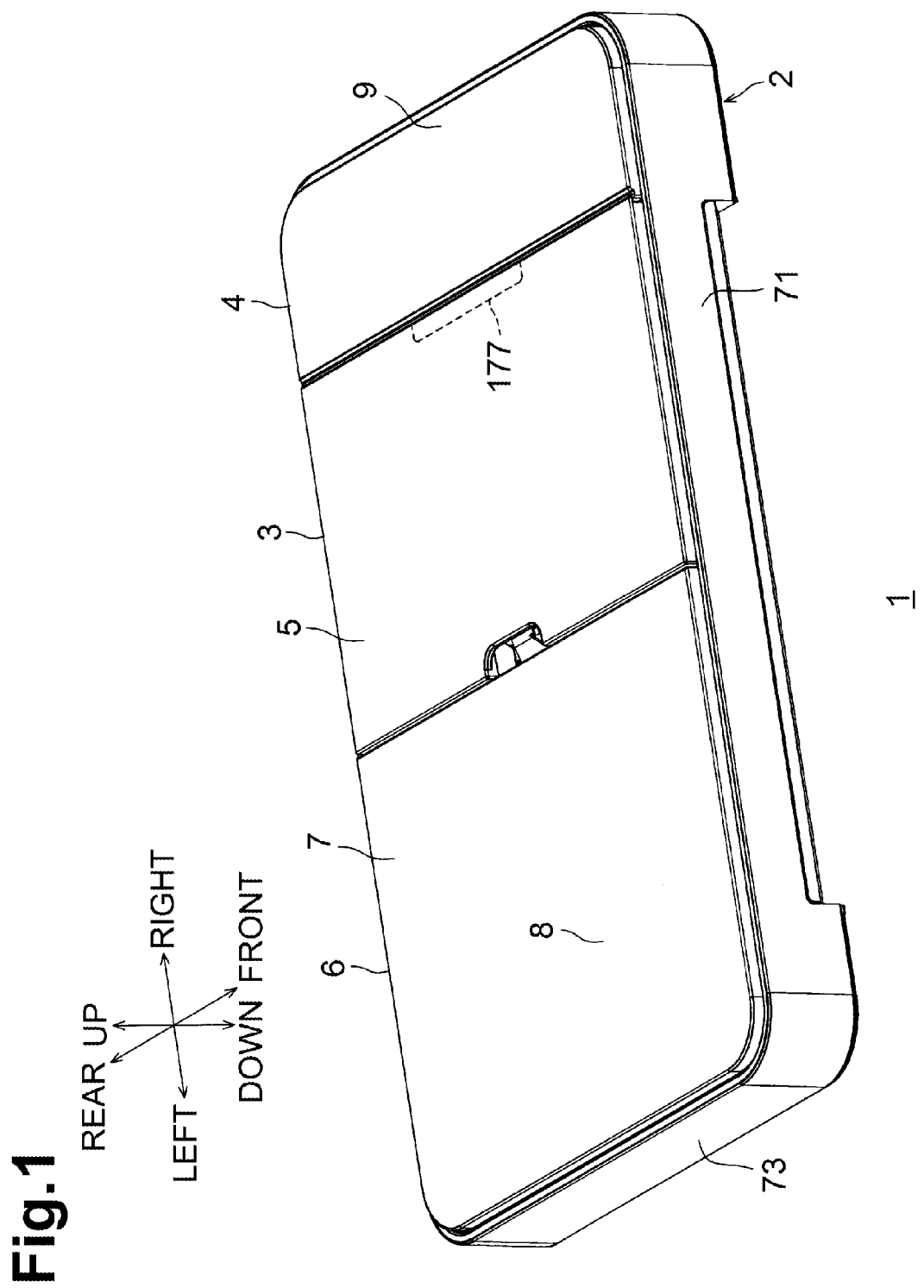
FIG. 1 is a perspective view depicting an image reading device in an illustrative embodiment according to one or more aspects of the disclosure, wherein a first cover is located at a cover position.
Figure 2:
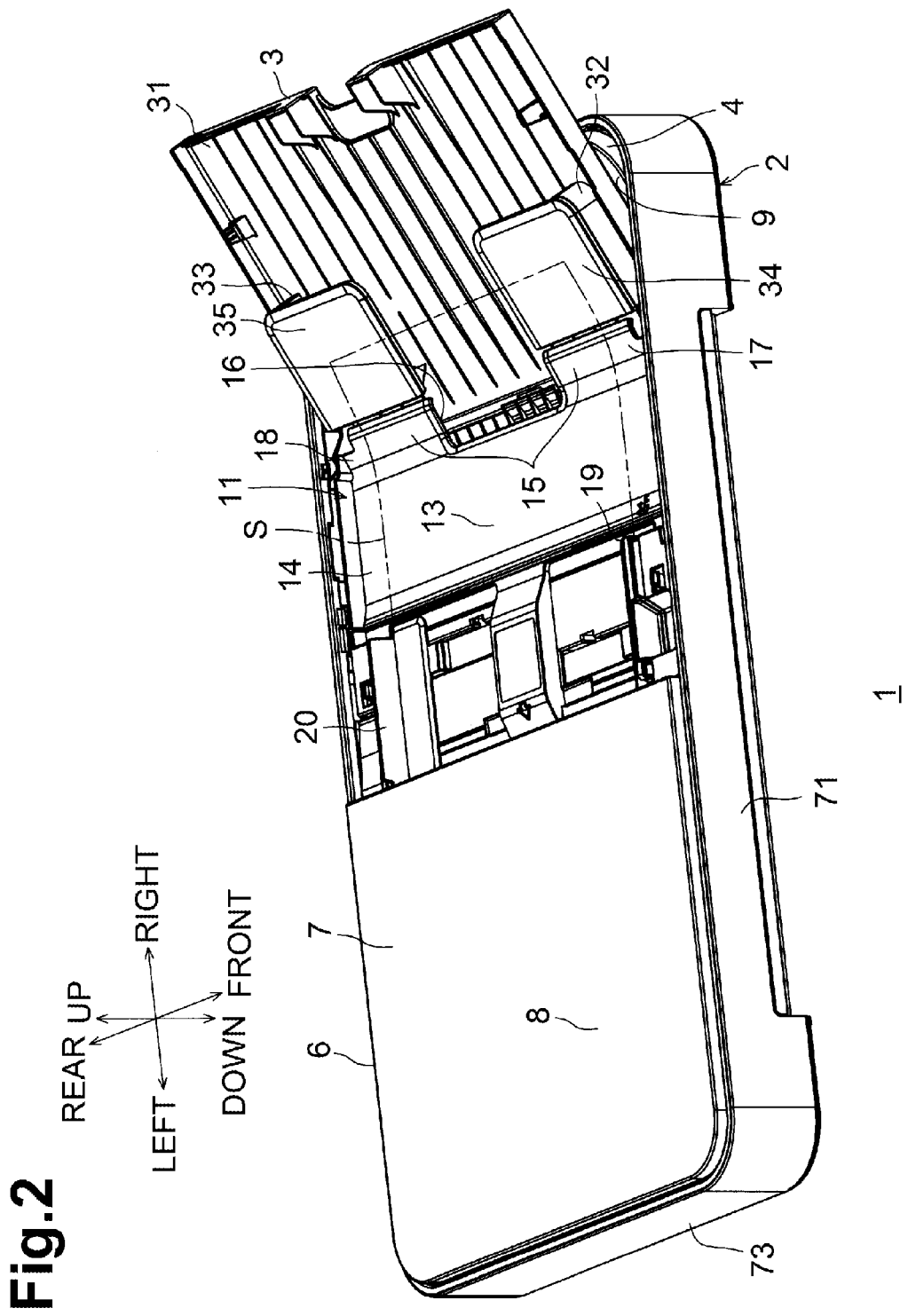
FIG. 2 is a perspective view depicting the image reading device in the illustrative embodiment according to one or more aspects of the disclosure, wherein the first cover is located at a tray position.
Figure 3:
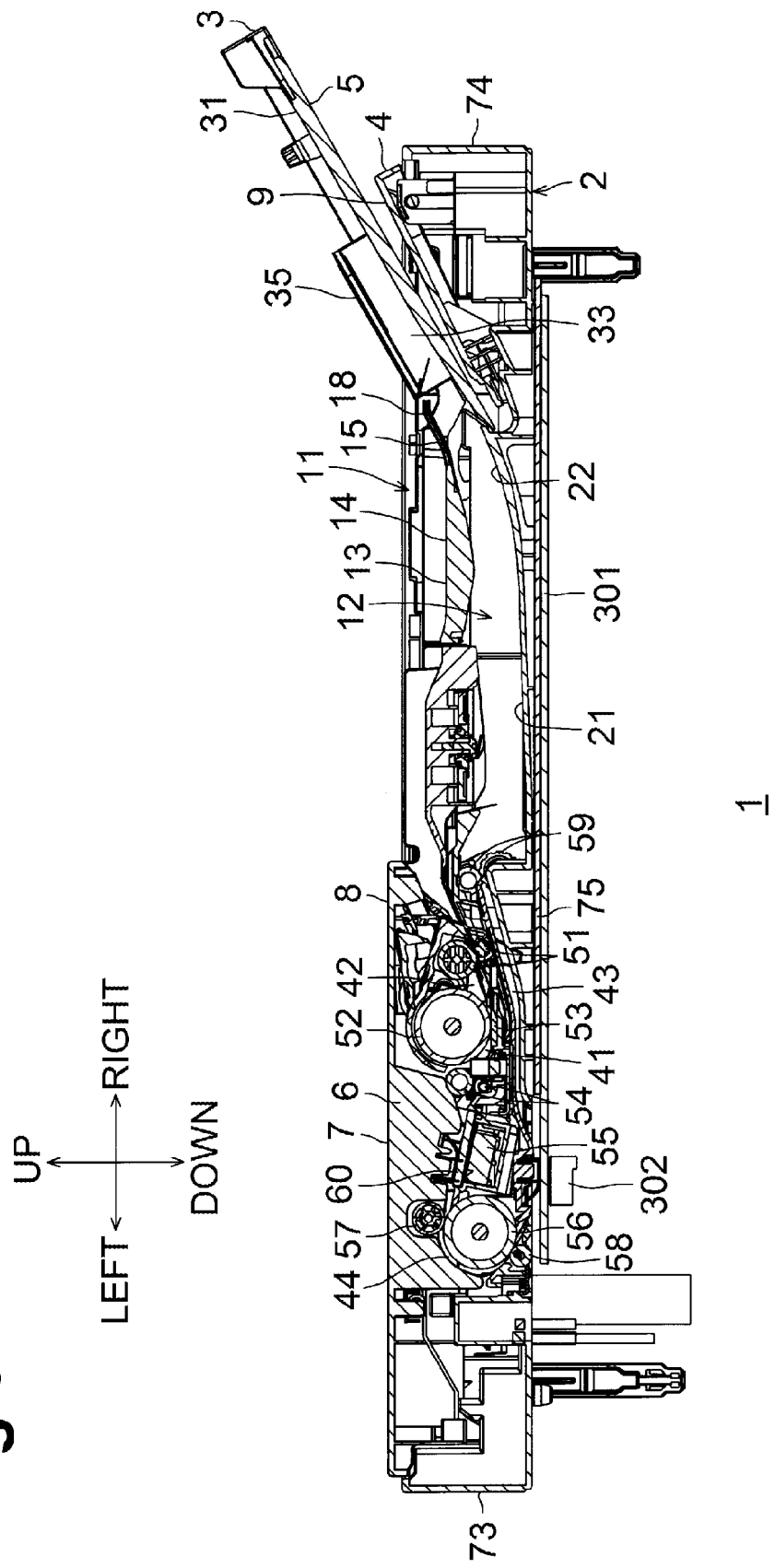
FIG. 3 is a midsectional view depicting the image reading device in the illustrative embodiment according to one or more aspects of the disclosure.

As depicted in the example of FIGS. 1, 2, and 3, an image reading device 1 comprises a housing 2, a second support portion such as a first cover 3, and a second cover 4. The first cover 3 and the second cover 4 may be supported adjacent to each other by the housing 2.

In the image reading device 1, a side on which the first cover 3 and the second cover 4 may be disposed may be defined as an upper side, and a side on which the second cover 4 may be disposed with reference to the first cover 3 may be defined as the right. With reference to these directions, directions of up, down, right, left, front, and rear may be defined. In the drawings of FIGS. 1 to 14I, these directions are indicated by arrows.

The first cover 3 as an example of a second support portion may be deviated to the right with respect to a middle position in the housing 2 in the right-left direction. The first cover 3 may be movable between a cover position depicted in FIG. 1 and a tray position depicted in the example of FIG. 2. As depicted in FIG. 1, at the cover position, the first cover 3 may extend along an upper edge of the housing 2 and constitute a portion of an upper cover that may cover an upper side of the housing 2. In a state where the first cover 3 is located at the cover position, a second surface such as an upper surface 5 of the first cover 3 may be coplanar with an upper surface 7 of a fixed cover 6 disposed on the left of the first cover 3. The upper surface 5 of the first cover 3 may constitute a portion of a flat device upper surface 8 of the image reading device 1 in conjunction with the upper surface 7 of the fixed cover 6. As depicted in FIG. 2, at the tray position, the first cover 3 may be inclined upward to the right and protrude from the housing 2.

The second cover 4 may be movable between a higher position depicted in FIG. 1 and a lower position depicted in FIG. 2. At the higher position, as depicted in FIG. 1, the second cover 4 may extend along the upper edge of the housing 2 and constitute a portion of the upper cover that may cover the upper side of the housing 2. In a state where the first cover 3 is located at the cover position and the second cover 4 is located at the higher position, an upper surface 9 of the second cover 4 may be coplanar with the upper surface 5 of the first cover 3 and the upper surface 7 of the fixed cover 6. The upper surface 9 of the second cover 4 may constitute a portion of the flat device upper surface 8 of the image reading device 1. As depicted in FIG. 2, at the lower position, the second cover 4 may be inclined downward to the left from an upper portion of the housing 2 in substantially parallel to a lower end portion of the first cover 3 located at the tray position.

As depicted in the example embodiment of FIG. 3, a pre-fed-sheet mount portion 11 and a discharged-sheet mount portion 12 may be disposed in the housing 2. The pre-fed-sheet mount portion 11 and the discharged-sheet mount portion 12 may be disposed, one above the other, below the first cover 3 located at the cover position.

Figure 4:
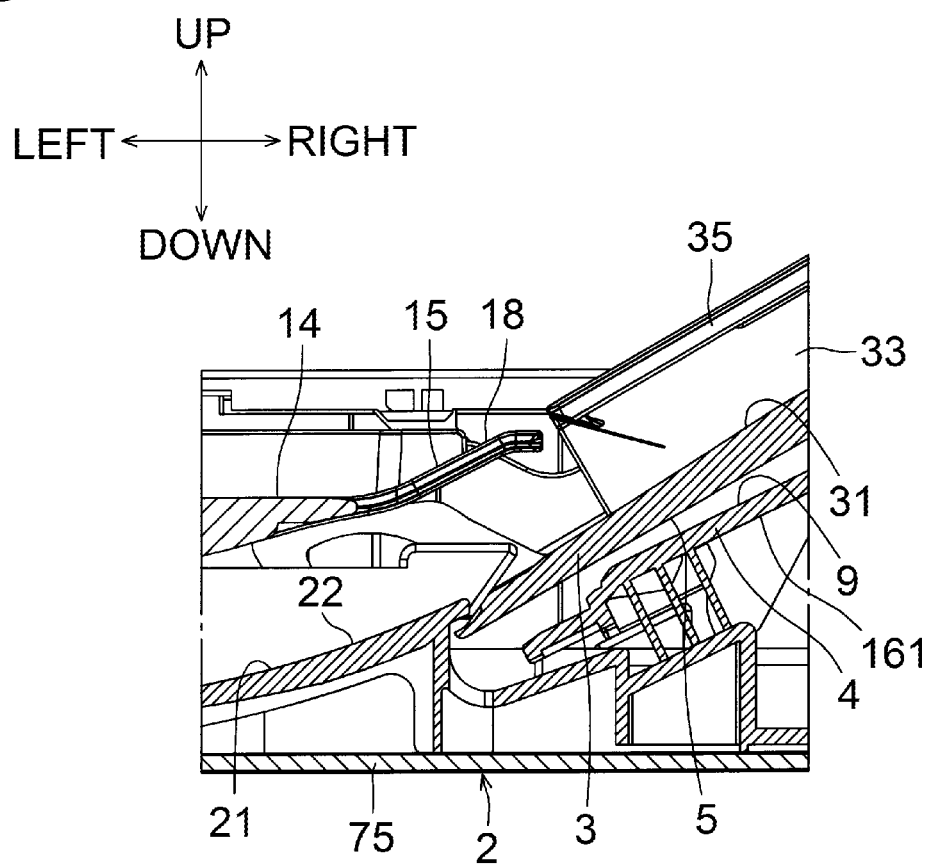
FIG. 4 is a sectional view depicting a pre-fed-sheet mount portion and a vicinity of a right end portion of a discharged-sheet mount portion in the illustrative embodiment according to one or more aspects of the disclosure.

As depicted in the example embodiment of FIG. 2, the pre-fed-sheet mount portion 11 may comprise a pre-fed-sheet mount surface 13 that may be exposed by the movement of the first cover 3 from the cover position to the tray position. The pre-fed-sheet mount surface 13 as an example of a first mount surface may comprise a horizontal portion 14 and an inclined portion 15. The horizontal portion 14 may be a substantially flat surface that may lie at a level lower than the device upper surface 8 and extend in both the front-rear direction and the right-left direction at a lower level than the upper edge of the housing 2. The inclined portion 15 may be inclined upward to the right from the horizontal portion 14. The inclined portion 15 may have a cutaway portion 16 in its middle portion in the front-rear direction. The inclined portion 15 may be divided into a front inclined portion 17 and a rear inclined portion 18 by the cutaway portion 16. The front inclined portion 17 and the rear inclined portion 18 may have the same width in the front-rear direction. As depicted in the example embodiment of FIG. 4, right end portions of the front inclined portion 17 and the rear inclined portion 18 may be curved so as to have more gentle inclination angles, respectively. In FIG. 4, although only the rear inclined portion 18 is depicted, the front inclined portion 17 may also have the same shape.

As depicted in the example embodiment of FIG. 2, the pre-fed-sheet mount portion 11 may comprise a pair of pre-fed-sheet guides 19 and 20 on the left of the pre-fed-sheet mount surface 13. The pre-fed-sheet guides 19 and 20 may be spaced apart from each other in the front-rear direction. The pair of pre-fed-sheet guides 19 and 20 may be configured to move closer to and away from each other by the same moving amount with reference to a middle position therebetween.

As depicted in the example embodiment of FIG. 3, the discharged-sheet mount portion 12 may be disposed below the pre-fed-sheet mount portion 11. The discharged-sheet mount portion 12 as an example of a second mount surface may comprise a discharged-sheet mount surface 21. The discharged-sheet mount surface 21 may extend in both the front-rear direction and the right-left direction below the pre-fed-sheet mount portion 11 while clearance is left below the pre-fed-sheet mount portion 11. A right end portion 22 of the discharged-sheet mount surface 21 may be inclined upward to the right in substantially parallel to the inclined portion 15 of the pre-fed-sheet mount surface 13.

The first cover 3 may comprise a first surface such as a discharged-sheet support surface 31 as a support surface on the other side thereof, wherein the other side may be opposite to a second surface such as the upper surface 5. As depicted in the example embodiment of FIG. 2, in a state where the first cover 3 is located at the tray position, discharged-sheet guide portions 32 and 33 as examples of a guide portion may be disposed at a left front end portion and a left rear end portion, respectively, on the discharged-sheet support surface 31. The discharged-sheet guide portions 32 and 33 may be integral with the discharged-sheet support surface 31, thereby being securely fixed to the discharged-sheet support surface 31. The discharged-sheet guide portions 32 and 33 may protrude from the discharged-sheet support surface 31 and extend in the right-left direction. Each of the discharged-sheet guide portions 32 and 33 may have one end 32A, 33A that may be fixed to the discharged-sheet support surface 31 and the other end 32B, 33B that may be free and opposite to the one end.

The discharged-sheet guide portions 32 and 33 may support a first support portion such as pre-fed sheet support portions 34 and 35, respectively. The pre-fed sheet support portions 34 and 35 may be colored in color that may be different from the color of the first cover 3. The pre-fed sheet support portions 34 and 35 may have a flat member, such as a plate member, having the same width in the front-rear direction as the front inclined portion 17 and the rear inclined portion 18. The front pre-fed sheet support portion 34 may be supported by the other end 32B, 33B of the discharged-sheet guide portion 32 and extend rearward in substantially parallel to the discharged-sheet support surface 31. The rear pre-fed sheet support portion 34 may be supported by the other end 32B, 33B of the discharged-sheet guide portion 33 and extend forward in substantially parallel to the discharged-sheet support surface 31.

In a state where the first cover 3 is located at the tray position, the pre-fed sheet support portions 34 and 35 may be located on the right of the front inclined portion 17 and the rear inclined portion 18, respectively. The pre-fed sheet support portions 34 and 35 may be inclined in substantially the same direction as the direction that front inclined portion 17 and the rear inclined portion 18 may extend. As depicted in FIG. 4, a left end portion of the pre-fed sheet support portion 35 may be located at a higher position than the right end portion of the rear inclined portion 18. Likewise, a left end portion of the pre-fed sheet support portion 34 may be located at a higher position than the right end portion of the front inclined portion 17. In a state where the first cover 3 is located at the tray position, a left end portion of the discharged-sheet support surface 31 may be located at a lower position than the right end portion of the discharged-sheet mount surface 21.

As depicted in the example embodiment of FIG. 3, a conveyance path 41, as a space, in which a sheet S may be conveyed may be defined on the left of the pre-fed-sheet mount portion 11 and the discharged-sheet mount portion 12 in the housing 2. The conveyance path 41 may have an upper path 42, a lower path 43, and a curved path 44. The upper path 42 may be disposed on a relatively upper side. The lower path 43 may be disposed on a relatively lower side. The curved path 44 may be disposed on the left of the upper path 42 and the lower path 43 and connect the upper path 42 and the lower path 43 to each other. The conveyance path 41 may be defined by various rollers for conveying a sheet S and guide surfaces disposed between the rollers.

A pair of supply rollers 51, a separation roller 52, a separation piece 53, a pair of conveyor rollers 54, an image sensor module 55, a reverse roller 56, following rollers 57 and 58, and a pair of discharge rollers 59 may define the conveyance path 41.

The pair of supply rollers 51 as an example of a sheet feeding portion may be disposed at an entrance of the upper path 42. The entrance of the upper path 42 may be disposed on the left of the pre-fed-sheet mount portion 11. One supply roller 51 may be disposed at a relatively higher position and may be rotatable on a rotational axis extending in the front-rear direction. The other supply roller 51 may be disposed at a relatively lower position and may be rotatable on a rotational axis extending in the front-rear direction. A peripheral surface of the upper supply roller 51 and a peripheral surface of the lower supply roller 51 may be in contact with each other, and the contact portion thereof may define a portion of the upper path 42.

The separation roller 52 may be disposed on the left of the upper supply roller 51 and may be rotatable on a rotational axis extending in the front-rear direction.

The separation piece 53 may be disposed below the separation roller 52. The separation piece 53 may be in contact with a peripheral surface of the separation roller 52 from below, and the contact portion thereof may define a portion of the upper path 42.

The pair of conveyor rollers 54 may be disposed on the left of the separation roller 52. One conveyor roller 54 may be disposed at a relatively higher position and may be rotatable on a rotational axis extending in the front-rear direction. The other conveyor roller 54 may be disposed at a relatively lower position and may be rotatable on a rotational axis extending in the front-rear direction. A peripheral surface of the upper conveyor roller 54 and a peripheral surface of the lower conveyor roller 54 may be in contact with each other, and the contact portion thereof may define a portion of the upper path 42.

The image sensor module 55 as an example of a reading portion may be disposed on the left of the lower conveyor roller 54. The image sensor module 55 may comprise therein, for example, a light source, lenses, and an image sensor. A contact glass 60 may be disposed on an upper surface of the image sensor module 55. The upper surface of the contact glass 60 and a guide surface that may face the upper surface of the contact glass 60 may define a portion of the upper path 42 therebetween.

The reverse roller 56 may be disposed on the left of the image sensor module 55. The reverse roller 56 may be rotatable on a rotational axis extending in the front-rear direction. A left peripheral surface of the reverse roller 56 and a curved guide surface that may face the left peripheral surface of the reverse roller 56 with being spaced apart therefrom at a predetermined interval may define a portion of the curved path 44 therebetween.

The following roller 57 may be disposed above the reverse roller 56. The following roller 57 may be rotatable on a rotational axis extending in the front-rear direction. A portion of a peripheral surface of the following roller 57 may be in contact with the peripheral surface of the reverse roller 56, and the contact portion thereof may define a portion of the curved path 44.

The following roller 58 may be disposed on the lower left of the reverse roller 56. The following roller 58 may be rotatable on a rotational axis extending in the front-rear direction. A portion of a peripheral surface of the following roller 58 may be in contact with the peripheral surface of the reverse roller 56, and the contact portion thereof may define a portion of the curved path 44.

The pair of discharge rollers 59 as an example of a sheet discharge portion may be disposed at an exit of the lower path 43. The exit of the lower path 43 may be disposed on the left of the discharged-sheet mount portion 12 and spaced apart from the left end portion of the discharged-sheet mount surface 21. One discharge roller 59 may be at a relatively higher position and may be rotatable on a rotational axis extending in the front-rear direction. The other discharge roller 59 may be disposed at a relatively lower position and may be rotatable on a rotational axis extending in the front-rear direction. A peripheral surface of the upper discharge roller 59 and a peripheral surface of the lower discharge roller 59 may be in contact with each other, and the contact portion thereof may define a portion of the lower path 43.

<Image Reading Operation>

As depicted in the example embodiment of FIG. 2, the positions of the pair of pre-fed-sheet guides 19 and 20 may be adjusted in accordance with a width of a sheet S to be read in the right-left direction. One or more sheets S may be placed with spreading over the pre-fed-sheet mount surface 13 and the pre-fed sheet support portions 34 and 35 while leading edge portions of the one or more sheets S are inserted between the pre-fed-sheet guides 19 and 20.

As an instruction to start reading an image from one or more sheets S, the pair of supply rollers 51 is issued, the separation roller 52, the separation piece 53, the pair of conveyor rollers 54, the reverse roller 56, the following rollers 57 and 58, and the pair of discharge rollers 59 may start rotating. By the rotation of the supply roller 51, a conveyance force may be applied to the one or more sheets S from the supply roller 51, and thus the one or more sheets S may be conveyed in the upper path 42 toward the separation roller 52. As the one or more sheets S reach the contact portion at which the separation roller 52 and the separation piece 53 contact each other, the one or more sheets S may be drawn into between the separation roller 52 and the separation piece 53, and thus the one or more sheets S may be separated into one sheet S. Then, the one separated sheet S may pass the separation roller 52 and the separation piece 53.

Thereafter, as the sheet S reaches the contact portion at which the conveyor rollers 54 contact each other, a conveyance force may be applied to the sheet S from the conveyor rollers 54, and thus the sheet S may be further conveyed in the upper path 42. By this conveyance, the sheet S may pass over the contact glass 60 of the image sensor module 55, and thus, may reach the contact portion at which the reverse roller 56 and the following roller 57 may contact each other. While the sheet S passes over the contact glass 60, the image sensor module 55 may read an image from one side of the sheet S.

After the sheet S reaches the contact portion at which the reverse roller 56 and the following roller 57 contact each other, the sheet S may be conveyed in the curved path 44. Then, the sheet S may pass between the reverse roller 56 and the following roller 58 and enter the lower path 43 from the curved path 44. A conveyance direction of the sheet S may be reversed while the sheet S is conveyed in the curved path 44.

An entrance of the lower path 43 may be open downward in the lower surface of the housing 2. The housing 2 may be united to a multifunction peripheral (not depicted) from above. The multifunction peripheral may comprise, for example, an image forming unit that may be accommodated therein. A contact glass 301 may be disposed on an upper surface of the image forming unit for supporting a sheet S to be read. An image sensor module 302 that may be movable in the right-left direction may be disposed below the contact glass 301. The image sensor module 302 may comprise therein, for example, a light source, lenses, and an image sensor. At the time of reading a moving sheet S, the image sensor module 302 may move to a predetermined stationary position. The sheet S may pass over the contact glass 301 to enter the lower path 43 from the curved path 44. As the sheet S passes over the contact glass 301, the image sensor module 302 located at the stationary position may read an image from the other side of the sheet S.

As the sheet S reaches the contact portion at which the discharge rollers 59 contact each other, a conveyance force may be applied to the sheet S from the discharge rollers 59, and thus the sheet S may be discharged from the exit of the lower path 43.

The discharged sheet S may move on the discharged-sheet mount surface 21 toward the discharged-sheet support surface 31 of the first cover 3. Depending on a size of the sheet S, as the sheet S approaches the discharged-sheet support surface 31, one or both edges of the sheet S in the front-rear direction may come into contact with one or both of the discharged-sheet guide portions 32 and 33. Then, the one or both edges of the sheet S in the front-rear direction may slide over the one or both of the discharged-sheet guide portions 32 and 33 in accordance with the movement of the sheet S on the discharged-sheet support surface 31, thereby correcting alignment of the sheet S. As the sheet S is released from the discharge rollers 59, the sheet S may be placed while spreading over the discharged-sheet mount surface 21 and the discharged-sheet support surface 31.

<Housing>

Figure 5:
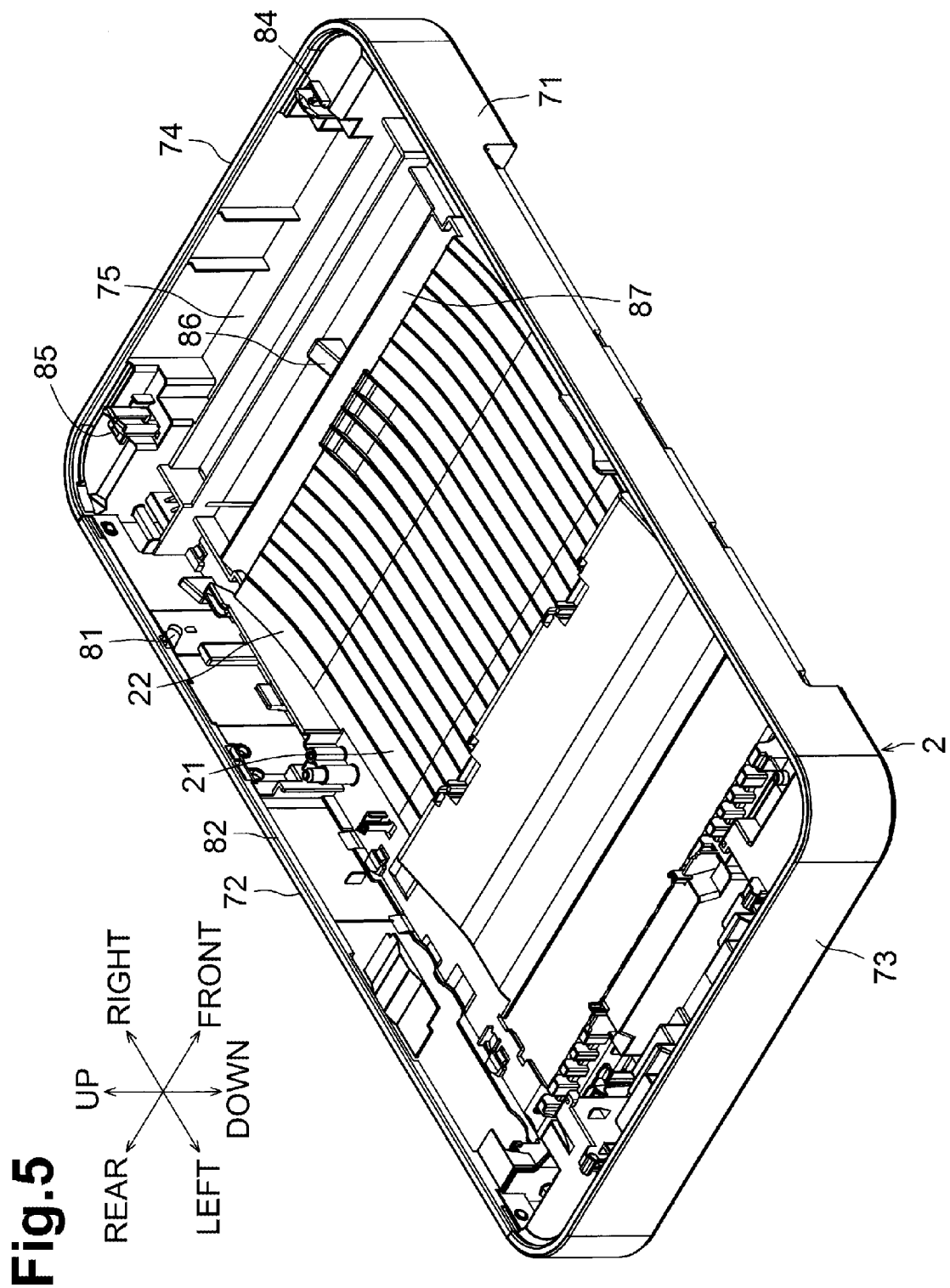
FIG. 5 is a perspective view depicting a housing in the illustrative embodiment according to one or more aspects of the disclosure.

As depicted in the example embodiment of FIG. 5, the housing 2 may comprise a front side-plate 71, a rear side-plate 72, a left side-plate 73, a right side-plate 74, and a bottom plate 75.

The front side-plate 71 and the rear side-plate 72 may be spaced apart from each other in the front-rear direction. The front side-plate 71 and the rear side-plate 72 may extend in parallel to each other in the right-left direction. The rear side-plate 72 may have a groove 81 in its inner surface at a position deviated to the right with respect to a middle position in the rear side-plate 72 in the right-left direction. The groove 81 may be recessed rearward from the inner surface of the rear side-plate 72 and have no upper end. The groove 81 may extend downward to the right. The inner surface of the rear side-plate 72 may comprise a stepped portion having a surface 82 at a position lower than an upper end surface of the rear side-plate 72. In a state where the first cover 3 is located at the cover position, a lower end of the first cover 3 may be in contact with the surface 82.

The front side-plate 71 may have a groove (not depicted) in its inner surface. The groove of the front side-plate 71 may have a shape that may be symmetrical to the shape of the groove 81. The inner surface of the front side-plate 71 may also comprise a stepped portion having a surface at a position lower than the upper end surface of the front side-plate 71. In the description below, the groove and the surface of the front side-plate 71 may be assigned the same reference numerals, respectively, as the groove 81 and the surface 82 of the rear side-plate 72.

The left side-plate 73 and the right side-plate 74 may be spaced apart from each other in the right-left direction. The left side-plate 73 and the right side-plate 74 may extend in parallel to each other in the front-rear direction. The left side-plate 73 may be connected to left end portions of the front side-plate 71 and the rear side-plate 72. The right side-plate 74 may be connected to right end portions of the front side-plate 71 and the rear side-plate 72.

The bottom plate 75 may disposed at lower ends of the front side-plate 71, the rear side-plate 72, the left side-plate 73, and the right side-plate 74 to connect therebetween. The discharged-sheet mount surface 21 may be defined on an upper surface of the bottom plate 75.

A pair of bearing portions 84 and 85 may be disposed at a right end portion of the upper surface of the bottom plate 75. The bearing portions 84 and 85 may be spaced apart from each other in the front-rear direction. The front bearing portion 84 may be a recess that may be recessed rearward. The rear bearing portion 85 may be a recess that may be recessed forward.

A contact portion 86 and a stopper 87 may be disposed on the right of the discharged-sheet mount surface 21 and may protrude from the upper surface of the bottom plate 75. The stopper 87 may be disposed between the discharged-sheet mount surface 21 and the contact portion 86.

<First Cover>

Figure 6:
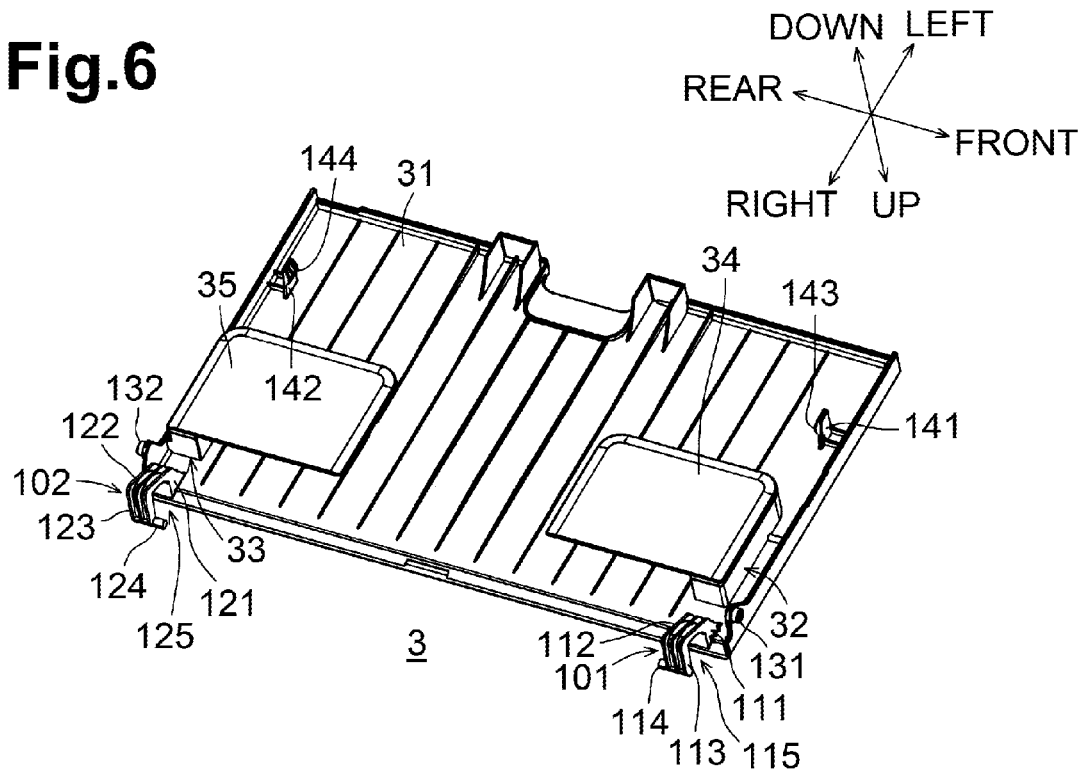
FIG. 6 is a perspective view depicting a discharged-sheet mount surface of the first cover in the illustrative embodiment according to one or more aspects of the disclosure.
Figure 7:
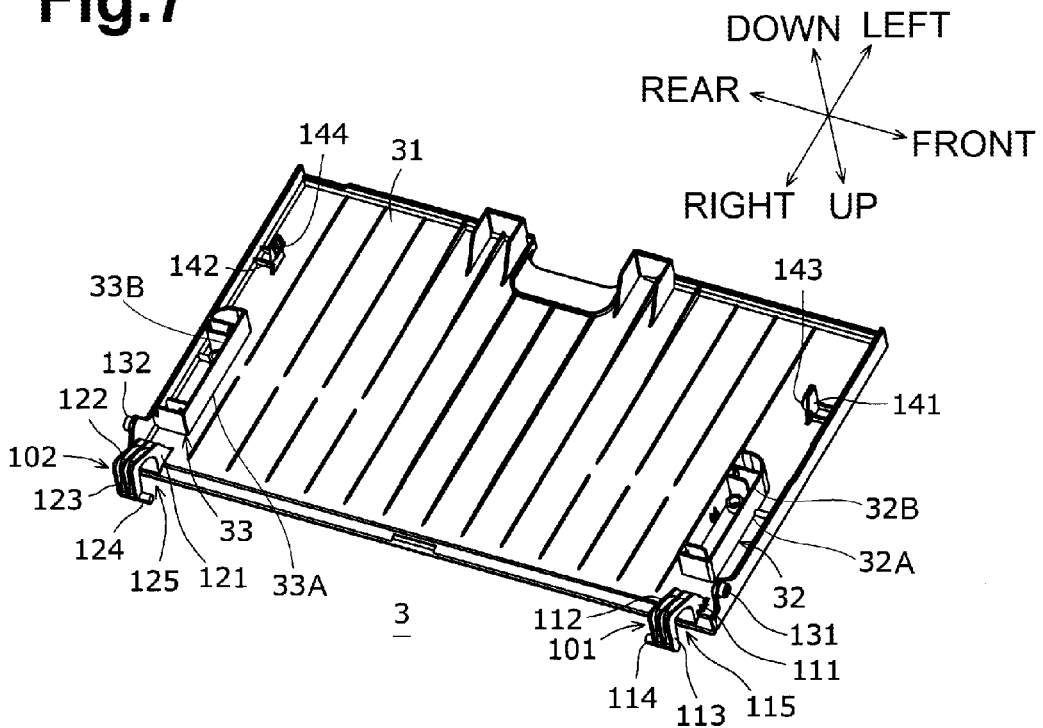
FIG. 7 is a perspective view depicting the discharged-sheet mount surface of the first cover in the illustrative embodiment according to one or more aspects of the disclosure, wherein pre-fed sheet support portions are removed from the first cover.
Figure 8:
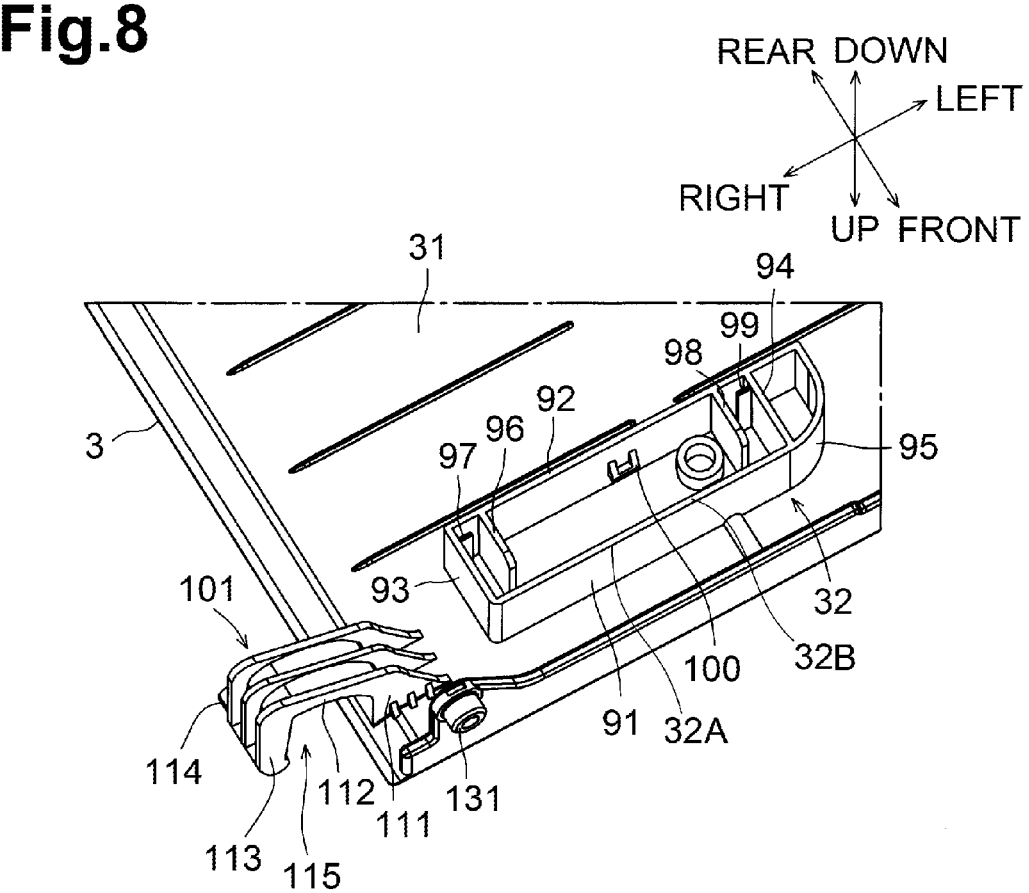
FIG. 8 is a perspective view depicting a portion of the discharged-sheet mount surface of the first cover in the illustrative embodiment according to one or more aspects of the disclosure.

Hereinafter, in a description of the first cover 3, the directions of up, down, right, left, front, and rear may be defined with reference to an orientation of the first cover 3 that may be located at the cover position (see FIG. 1). FIGS. 6, 7, and 8 each depict example embodiments of the upside-down first cover 3 that is removed from the housing 2.

The discharged-sheet guide portions 32 and 33 may protrude from a right front end portion and a right rear end portion, respectively, of the discharged-sheet mount surface 21. Shapes of the front and rear discharged-sheet guide portions 32 and 33 may be symmetrical to each other. Therefore, a description of a configuration of the front discharged-sheet guide portion 32 is presented below but a description of a configuration the rear discharged-sheet guide portion 33 is omitted.

As depicted in the example embodiment of FIG. 8, the discharged-sheet guide portion 32 may comprise a first wall portion 91, a second wall portion 92, a third wall portion 93, a fourth wall portion 94, a fifth wall portion 95, a sixth wall portion 96, a seventh wall portion 97, an eighth wall portion 98, and a ninth wall portion 99 that may be integral with each other. The wall portions 91 to 99 may protrude from the discharged-sheet support surface 31.

The first wall portion 91 and the second wall portion 92 as examples of a holding portion may be spaced apart from each other in the front-rear direction. The first wall portion 91 and the second wall portion 92 may extend in parallel to each other in the right-left direction. The second wall portion 92 may extend to the left beyond the first wall portion 91. A protrusion 100 may be disposed on a surface of the second wall portion 92, wherein the surface may face the first wall portion 91. The protrusion 100 may protrude from substantially a middle position of the surface of the second wall portion 92 in the right-left direction.

The third wall portion 93 may be connected to right end portions of the first wall portion 91 and the second wall portion 92 and extend in the front-rear direction.

The fourth wall portion 94 may be connected to a left end portion of the first wall portion 91 and a portion between both ends of the second wall portion 92 in the right-left direction and extend in the front-rear direction.

The fifth wall portion 95 may be connected to the left end portions of the first wall portion 91 and the second wall portion 92 and may be curved forward to the left.

The sixth wall portion 96 as another example of the holding portion may be disposed while clearance is left on the left of the third wall portion 93. The sixth wall portion 96 may extend in parallel to the third wall portion 93 in the front-rear direction. A rear end of the sixth wall portion 96 may be connected to the second wall portion 92. Clearance may be left between the front end of the sixth wall portion 96 and the first wall portion 91.

The seventh wall portion 97 as still another example of the holding portion may be disposed between the third wall portion 93 and the sixth wall portion 96. The seventh wall portion 97 may extend in parallel to the second wall portion 92 in the right-left direction while being spaced apart from the second wall portion 92. A right end of the seventh wall portion 97 may be connected to the third wall portion 93. Clearance may be left between a left end of the seventh wall portion 97 and the sixth wall portion 96.

The eighth wall portion 98 as yet another example of the holding portion may be disposed while clearance is left on the right of the fourth wall portion 94. The eighth wall portion 98 may extend in parallel to the fourth wall portion 94 in the front-rear direction. A rear end of the eighth wall portion 98 may be connected to the second wall portion 92. Clearance may be left between a front end of the eighth wall portion 98 and the first wall portion 91.

The ninth wall portion 99 as further example of the holding portion may be disposed between the fourth wall portion 94 and the eighth wall portion 98. The ninth wall portion 99 may extend in parallel to the second wall portion 92 while being spaced apart from the second wall portion 92. A left end of the ninth wall portion 99 may be connected to the fourth wall portion 94. Clearance may be left between a left end of the ninth wall portion 99 and the eighth wall portion 98.

As depicted in the example embodiments of FIGS. 6 and 7, arms 101 and 102 may be disposed at a right front end portion and a right rear end portion, respectively, in the first cover 3.

The front arm 101 may comprise a projecting portion 111, an extended portion 112, a distal end portion 113, and a boss 114 that may be integral with each other. The projecting portion 111 may protrude from the discharged-sheet support surface 31. The extended portion 112 may extend rightward from a lower end of the projecting portion 111. The distal end portion 113 may extend upward from a right end of the extended portion 112. The boss 114 may protrude rearward from the distal end portion 113. Such a shape may provide the arm 101 with a recess 115 between the projecting portion 111 and the distal end portion 113.

The rear arm 102 may have a shape that may be symmetrical to the shape of the front arm 101. More specifically, the rear arm 102 may comprise a projecting portion 121, an extended portion 122, a distal end portion 123, and a boss 124 that may be integral with each other. The projecting portion 121 may protrude from the discharged-sheet support surface 31. The extended portion 122 may extend rightward from a lower end of the projecting portion 121. The distal end portion 123 may extend upward from a right end of the extended portion 122. The boss 124 may protrude forward from the distal end portion 123. Such a shape may provide the arm 102 with a recess 125 between the projecting portion 121 and the distal end portion 123.

The first cover 3 may further comprise a plurality of, for example, two, shafts 131 and 132. The shafts 131 and 132 may be disposed on the same line extending in the front-rear direction. The shaft 131 may protrude forward from a right end portion of a front surface of the first cover 3. The shaft 132 may protrude rearward from a right end portion of a rear surface of the first cover 3.

The first cover 3 may further comprise a plurality of, for example, two, stopper protrusions 141 and 142. The stopper protrusions 141 and 142 as an example of a lock portion may protrude from a left front end portion and a left rear end portion, respectively, of the discharged-sheet support surface 31. The stopper protrusions 141 and 142 may be disposed at the same position in the right-left direction. The front stopper protrusion 141 may comprise a projecting portion 143 at its distal end portions. The projecting portion 143 may protrude rearward therefrom. The rear stopper protrusion 142 may comprise a projecting portion 144 at its distal end portions. The projecting portion 144 may protrude forward therefrom.

<Pre-Fed Sheet Support Portions>

Hereinafter, in the description of the pre-fed sheet support portions 34 and 35, the directions of up, down, right, left, front, and rear may be defined with reference to the orientation of the first cover 3 that may be located at the cover position (see FIG. 1).

Shapes of the front and rear pre-fed sheet support portions 34 and 35 may be symmetrical to each other. Therefore a description of a configuration of the front pre-fed sheet support portion 34 is presented below but a description of a configuration of the rear pre-fed sheet support portion 35 is omitted.

Figure 9:
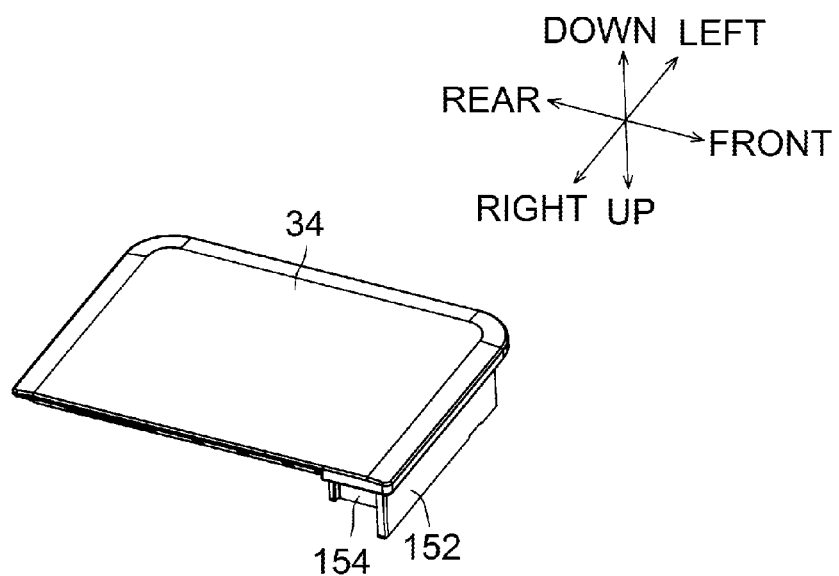
FIG. 9 is a perspective view depicting one of the pre-fed sheet support portions in the illustrative embodiment according to one or more aspects of the disclosure.
Figure 10:
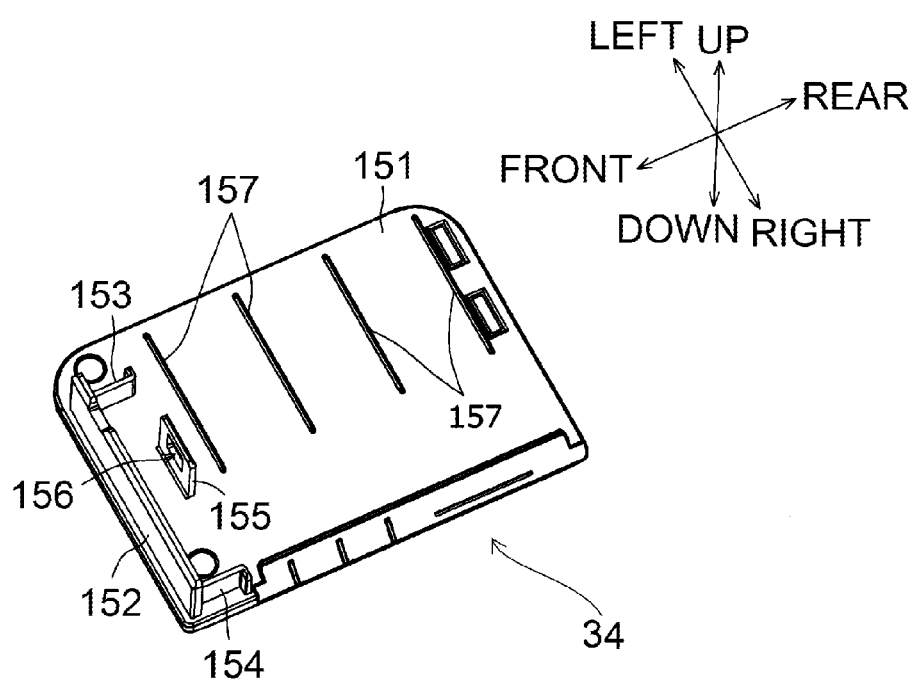
FIG. 10 is a perspective view depicting one surface, facing a sheet discharge guide portion, of one of the pre-fed sheet support portion in the illustrative embodiment according to one or more aspects of the disclosure.

As depicted in the example embodiments of FIGS. 9 and 10, the pre-fed sheet support portion 34 may comprise a first insertion wall portion 152, a second insertion wall portion 153, a third insertion wall portion 154, and a stopper wall portion 155 on its surface 151 that may be opposite to the surface on which a pre-fed sheet S (see FIG. 2) may be placed.

The first insertion wall portion 152 as an example of a held portion may protrude from a front end portion of the surface 151. The first insertion wall portion 152 may extend across substantially a width of the surface 151 in the right-left direction.

The second insertion wall portion 153 as another example of the held portion may be disposed behind a left end portion of the first insertion wall portion 152 in a protruding manner. The second insertion wall portion 153 may extend rearward from the first insertion wall portion 152, bent and further extend leftward.

The third insertion wall portion 154 as still another example of the held portion may be disposed behind a right end portion of the first insertion wall portion 152 in a protruding manner. The third insertion wall portion 154 may extend rearward from the first insertion wall portion 152, bent and further extend rightward.

The stopper wall portion 155 may be disposed between the second insertion wall portion 153 and the third insertion wall portion 154. The stopper wall portion 155 may be spaced apart from the first insertion wall portion 152 in the front-rear direction, and extend in parallel to the first insertion wall portion 152 in the right-left direction. The stopper wall portion 155 may have a stopper hole 156 that may pass therethrough in the front-rear direction.

To attach the pre-fed sheet support portion 34 to the discharged-sheet guide portion 32, the first insertion wall portion 152 may be inserted into a space defined by the first wall portion 91, the eighth wall portion 98, and the sixth wall portion 96 of the discharged-sheet guide portion 32. An rearward extended portion of the second insertion wall portion 153 may be inserted into a space defined by the eighth wall portion 98 and the ninth wall portion 99 of the discharged-sheet guide portion 32. A leftward extended portion of the second insertion wall portion 153 may be inserted into a space defined by the second wall portion 92 and the ninth wall portion 99 of the discharged-sheet guide portion 32. A rearward extended portion of the third insertion wall portion 154 may be inserted into a space defined by the sixth wall portion 96 and the seventh wall portion 97 of the discharged-sheet guide portion 32. A rightward extended portion of the third insertion wall portion 154 may be inserted into a space defined by the second wall portion 92 and the seventh wall portion 97 of discharged-sheet guide portion 32. The protrusion 100 of the discharged-sheet guide portion 32 may be caught in the stopper hole 156 of the stopper wall portion 155 from behind, whereby the stopper wall portion 155 and the protrusion 100 may be engaged with each other. Thus, the attachment of the pre-fed sheet support portion 34 to the discharged-sheet guide portion 32 may be implemented. In a state where the pre-fed sheet support portion 34 is attached on the discharged-sheet guide portion 32, lower ends of the first wall portion 91, the second wall portion 92, the third wall portion 93, the fourth wall portion 94, the fifth wall portion 95, the sixth wall portion 96, and the eighth wall portion 98 of the discharged-sheet guide portion 32 may be in contact with the surface 151 of the pre-fed sheet support portion 34.

The pre-fed sheet support portion 34 may comprise a plurality of ribs 157 on the surface 151. The plurality of ribs 157 may protrude from the surface 151 and extend in the right-left direction.

<Second Cover>

Figure 11:
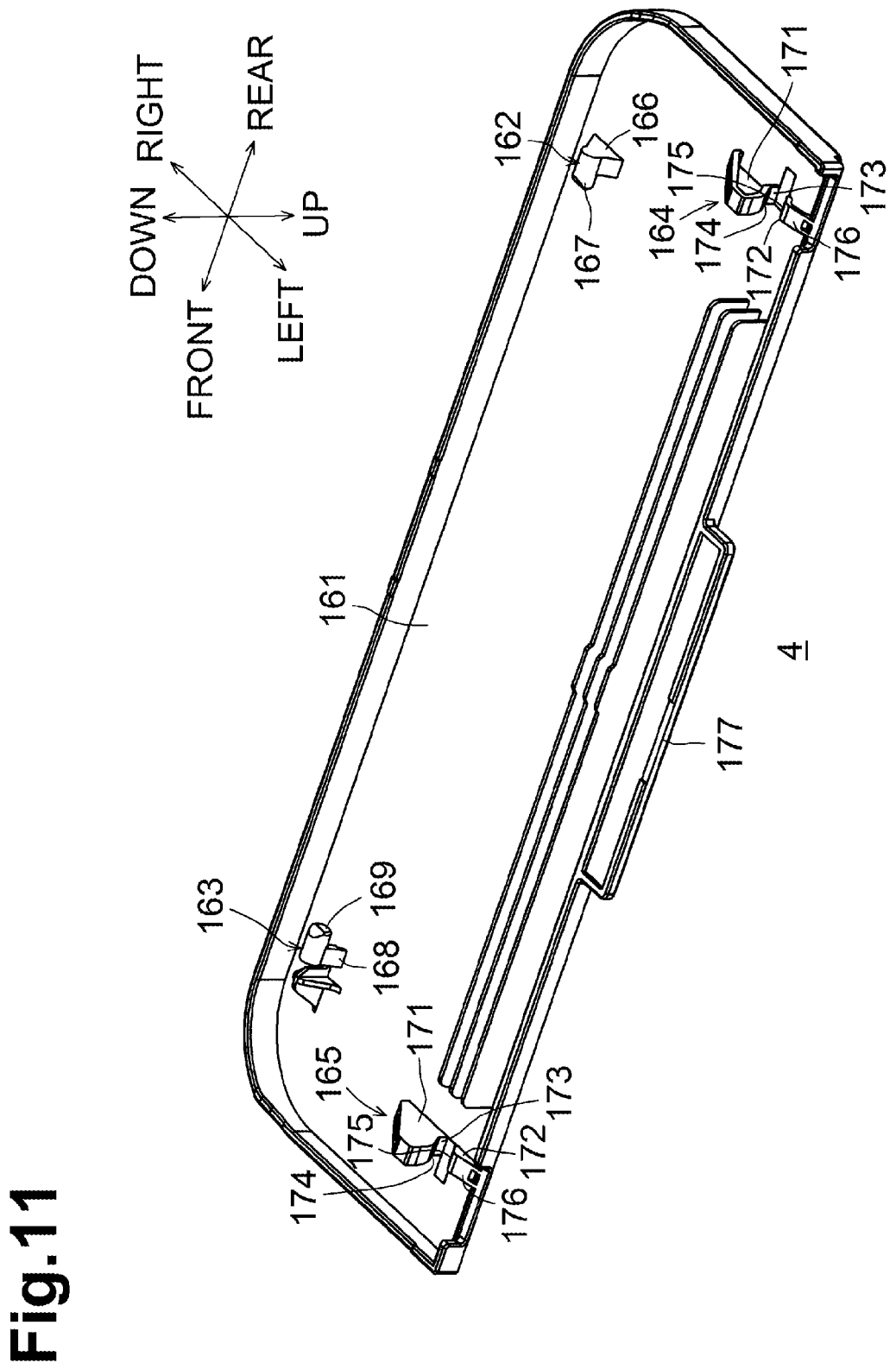
FIG. 11 is a perspective view depicting a lower surface of a second cover in the illustrative embodiment according to one or more aspects of the disclosure.

Hereinafter, in a description of the second cover 4, the directions of up, down, right, left, front, and rear may be defined with reference to the orientation of the first cover 3 that may be located at the cover position (see FIG. 1). FIG. 11 depicts the upside-down second cover 4 that is removed from the housing 2.

The second cover 4 may comprise a plurality of, for example, two, swing shaft portions 162 and 163 and a plurality of, for example, two, catch portions 164 and 165 on its lower surface 161 that may be opposite to the upper surface 9 (see FIG. 1).

The swing shaft portions 162 and 163 may be disposed on a right end portion of the lower surface 161 and spaced apart from each other in the front-rear direction. The rear swing shaft portion 162 may comprise a protruding portion 166 and a shaft 167 that may be integral with each other. The protruding portion 166 may protrude from the lower surface 161. The shaft 167 may protrude forward from the protruding portion 166. The front swing shaft portion 163 may have a symmetrical configuration to that of the rear swing shaft portion 162. That is, the front swing shaft portion 163 may comprise a protruding portion 168 and a shaft 169 that may be integral with each other. The protruding portion 168 may protrude from the lower surface 161. The shaft 169 may protrude rearward from the protruding portion 168.

The catch portions 164 and 165 may be disposed at a left end portion of the lower surface 161 and spaced apart from each other in the front-rear direction. The catch portions 164 and 165 may comprise an acting portion 171 and a lead-in portion 172.

The acting portion 171 may protrude from the lower surface 161. The acting portion 171 may comprise a wall portion 173 and a pressed portion 174. The wall portion 173 may protrude from the lower surface 161 perpendicular to the lower surface 161. The pressed portion 174 may extend inclinatory downward to the left from a lower end of the wall portion 173.

The lead-in portion 172 may be disposed on the left of the acting portion 171. The lead-in portion 172 may comprise a first inclined surface 175 and a second inclined surface 176. The first inclined surface 175 may be inclined downward to the left from the lower surface 161. The second inclined surface 176 may be inclined upward to the left from a lower end of the first inclined surface 175. A space may be left between the first inclined surface 175 and the pressed portion 174 of the acting portion 171. A size of the space therebetween may be substantially the same as a diameter of each of the bosses 114 and 124. The second inclined surface 176 may extend to a left edge of the second cover 4.

The second cover 4 may comprise a plate-shaped projecting portion 177. The projecting portion 177 may protrude leftward from a middle portion of the left edge of the second cover 4.

<Interlock Mechanism>

Figure 12:
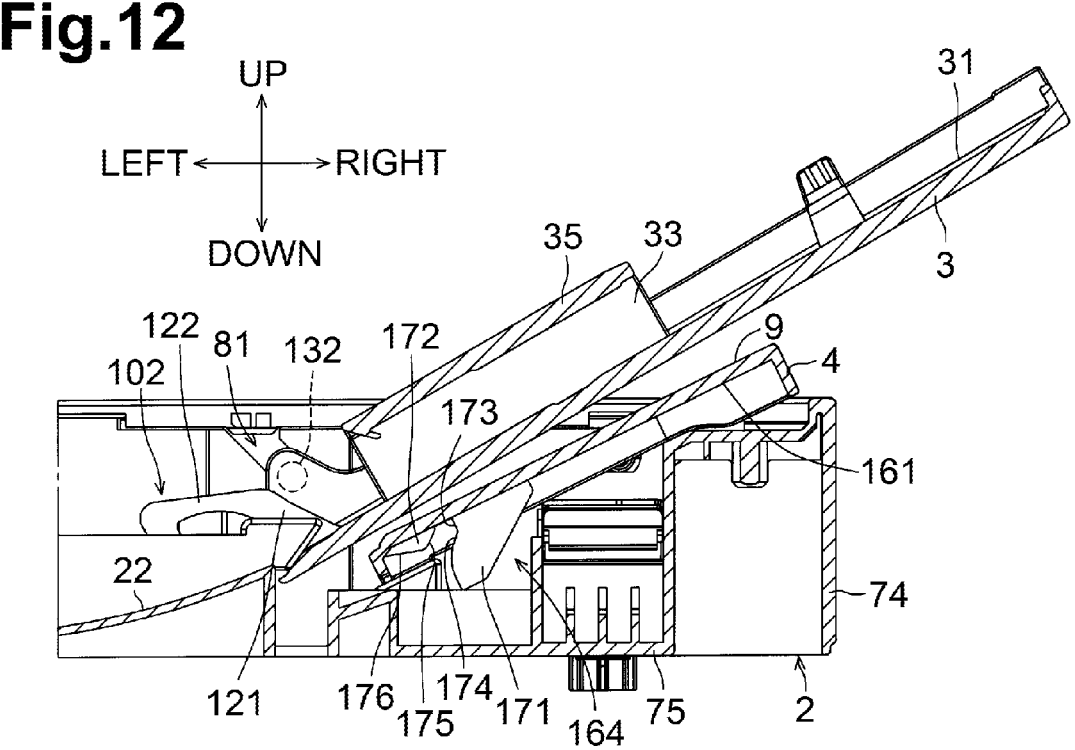
FIG. 12 is a sectional view of a right end portion of the image reading device in the illustrative embodiment according to one or more aspects of the disclosure, wherein the first cover is located at the tray position and the second cover is located at a lower position.

As depicted in the example embodiment of FIG. 12, the first cover 3 may be pivotably supported by the housing 2 while the shafts 131 and 132 are engaged in the respective grooves 81 in the housing 2.

The second cover 4 may be pivotably supported by the housing 2 while the shafts 167 and 169 (see FIG. 11) are engaged in the respective bearing portions 84 and 85 of the housing 2 (see FIG. 5).

Figure 13:
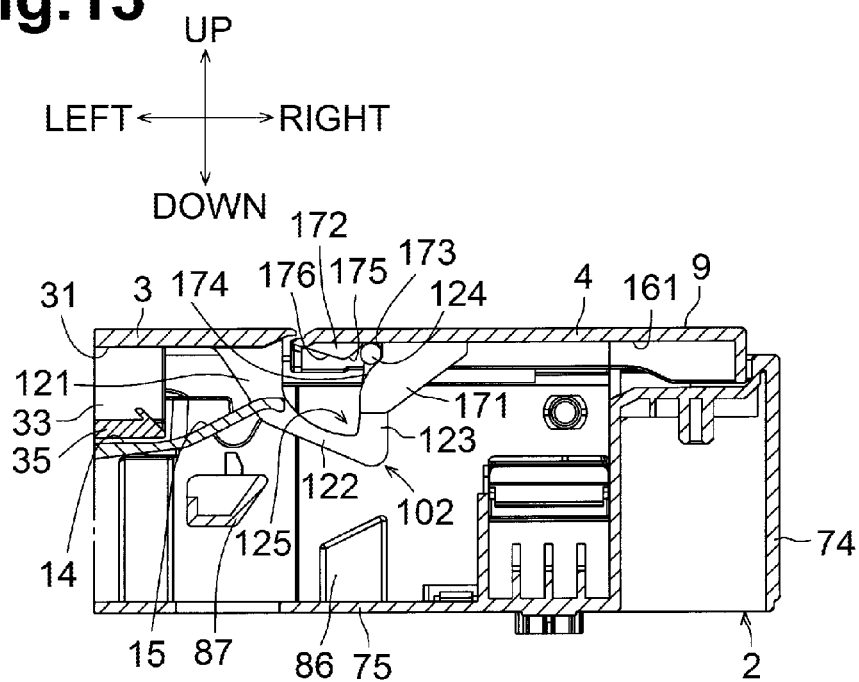
FIG. 13 is a sectional view of the right end portion of the image reading device in the illustrative embodiment according to one or more aspects of the disclosure, wherein the first cover is located at the cover position and the second cover is located at a higher position.
Figure 14A:
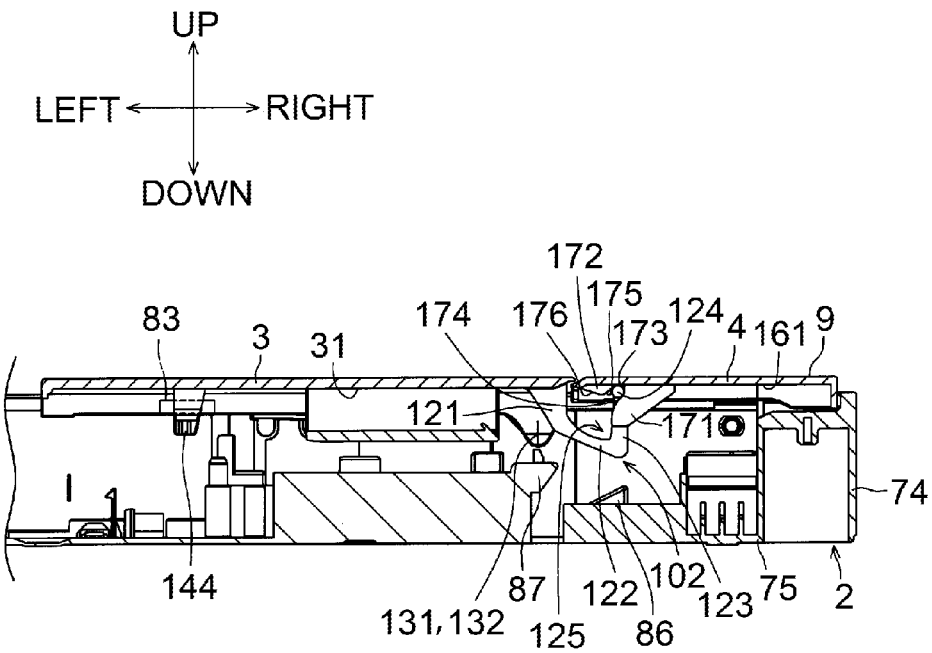
FIG. 14A is a sectional view of the right end portion of the image reading device in the illustrative embodiment according to one or more aspects of the disclosure, wherein locations of shafts and a location of a boss are depicted in a state where the first cover is located at the cover position and the second cover is located at the higher position.
Figure 14B:
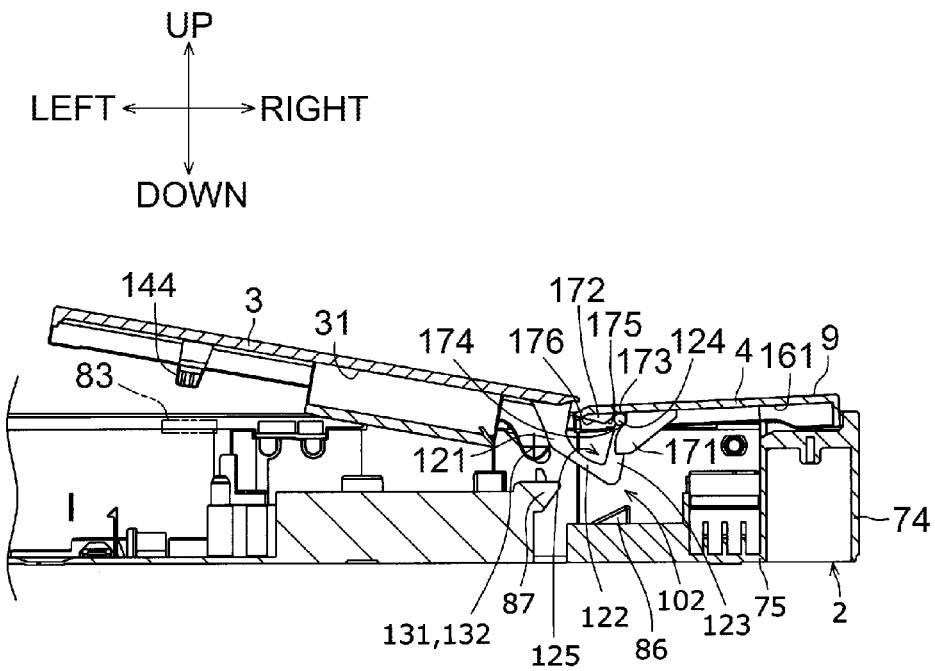
FIG. 14B is a sectional view of the right end portion of the image reading device in the illustrative embodiment according to one or more aspects of the disclosure, wherein the locations of the shafts and the boss are depicted in a state where the first cover is located at a position closer to the tray position than the position of the first cover depicted in FIG. 14A.

In a state where the first cover 3 is located at the cover position and the second cover 4 is located at the higher position, as depicted in FIGS. 13 and 14A, the boss 124 of the arm 102 of the first cover 3 may be located between the rear acting portion 171 and the rear lead-in portion 172 of the second cover 4 and be in contact with the lower surface 161 of the second cover 4. Similar to the boss 124 of the rear arm 102, the boss 114 of the front arm 101 may be located between the front acting portion 171 and the front lead-in portion 172 of the second cover 4 and be in contact with the lower surface 161 of the second cover 4. The shafts 131 and 132 may be located on lower ends of the grooves 81, respectively. As depicted in FIG. 1, the projecting portion 177 of the second cover 4 may be located below the first cover 3. As depicted in FIG. 13, the pre-fed sheet support portions 34 and 35 may be accommodated between the first cover 3 and the horizontal portion 14 of the pre-fed-sheet mount surface 13.

As indicated by a double-dotted and dashed line in FIG. 14A, stopper portions 83 may be disposed at a front end portion and a rear end portion, respectively, in the housing 2. The stopper portions 83 may be disposed at a substantially middle position in the housing 2 in the right-left direction. Each stopper portion 83 may have a thickness in the front-rear direction and extend in the right-left direction. For example, a member that may extend in the up-down direction with its upper end portion being bent and extending forward may be disposed at a substantially middle portion of the front end portion in the right-left direction in the housing 2. The upper end portion of the member may serve as the front stopper portion 83. Further, a member that may extend in the up-down direction with its upper end portion being bent and extending rearward may be disposed at a substantially middle portion of the rear end portion in the right-left direction in the housing 2. The rear end portion of the member may serve as the rear stopper portion 83. In a state where the first cover 3 is located at the cover position, the projecting portion 143 of the stopper protrusion 141 and the projecting portion 144 of the stopper protrusion 142 of the first cover 3 may be located under the front and rear stopper portions 83, respectively, and thus, the projecting portions 143 and 144 may be caught by the respective stopper portions 83 in the engaged state.

As the first cover 3 moves toward the tray position in the state where the first cover 3 is located at the cover position and the second cover 4 is located at the higher position, the bosses 114 and 124 may press the pressed portions 174 of the acting portions 171 downward, respectively. In accordance with the downward pressing, the second cover 4 may pivot on the shafts 167 and 169 to tilt downward to the left and thus the left end portion of the second cover 4 may come into the recesses 115 and 125, respectively, defined in the respective arms 101 and 102. The recess 115 may be disposed between one of the wall portions 173 and the shaft 131 and the recess 125 may be disposed between the other of the wall portions 173 and the shaft 132 in front view. In accordance with the pivoting of the second cover 4, the wall portions 173 of the acting portions 171 may press the respective bosses 114 and 124 leftward, thereby moving the shafts 131 and 132 of the first cover 3 upward to the left within the respective grooves 81. In accordance with the movement of the first cover 3 from the tray position, the stopper protrusions 141 and 142 may be deformed elastically and the projecting portions 143 and 144 may be released from the respective stopper portions 83.

Figure 14C:
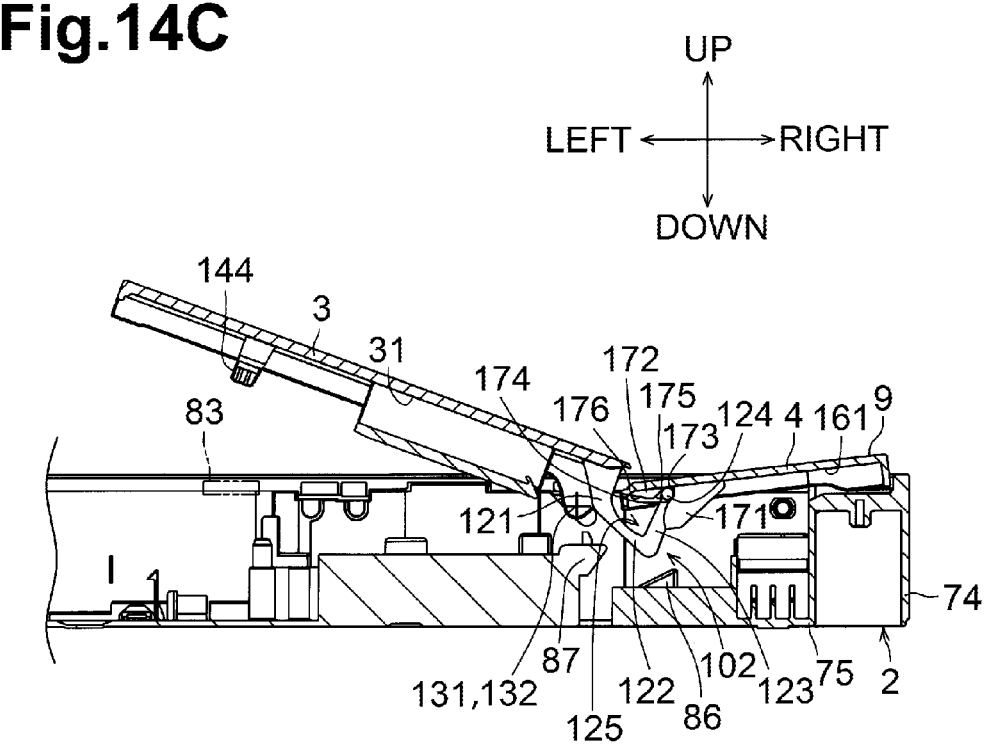
FIG. 14C is a sectional view of the right end portion of the image reading device in the illustrative embodiment according to one or more aspects of the disclosure, wherein the locations of the shafts and the boss are depicted in a state where the first cover is located at a position closer to the tray position than the position of the first cover depicted in FIG. 14B.
Figure 14D:
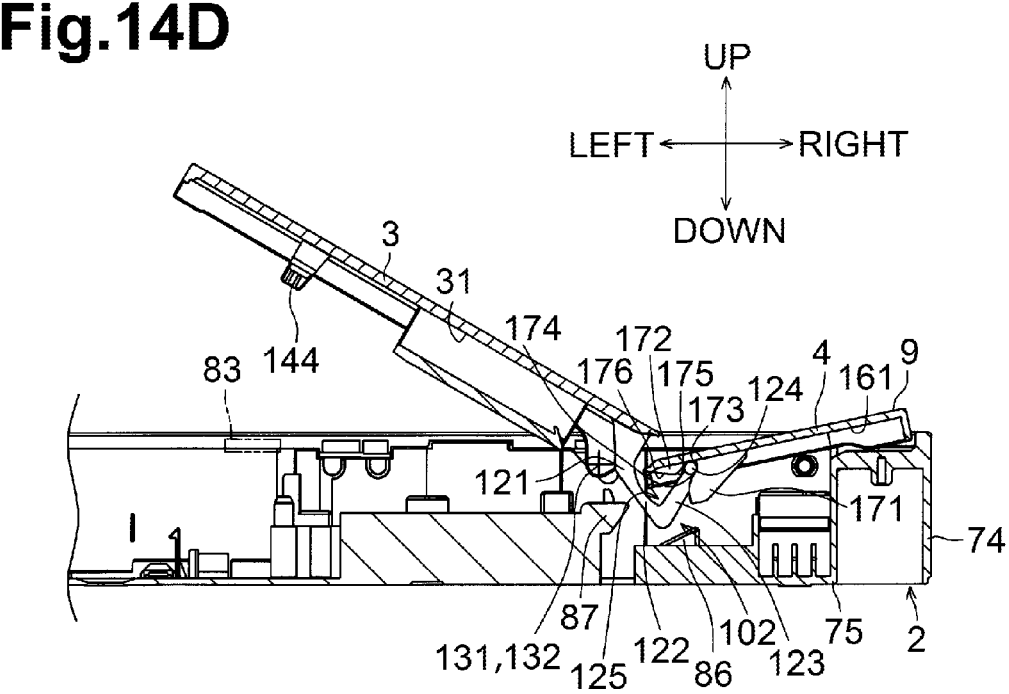
FIG. 14D is a sectional view of the right end portion of the image reading device in the illustrative embodiment according to one or more aspects of the disclosure, wherein the locations of the shafts and the boss are depicted in a state where the first cover is located at a position closer to the tray position than the position of the first cover depicted in FIG. 14C.

Thereafter, as depicted in the example embodiments of FIGS. 14C and 14D, as the first cover 3 further pivots toward the tray position, the second cover 4 may tilt more and more from the higher position and the shafts 131 and 132 of the first cover 3 may move further upward to the left in the respective grooves 81.

Figure 14E:
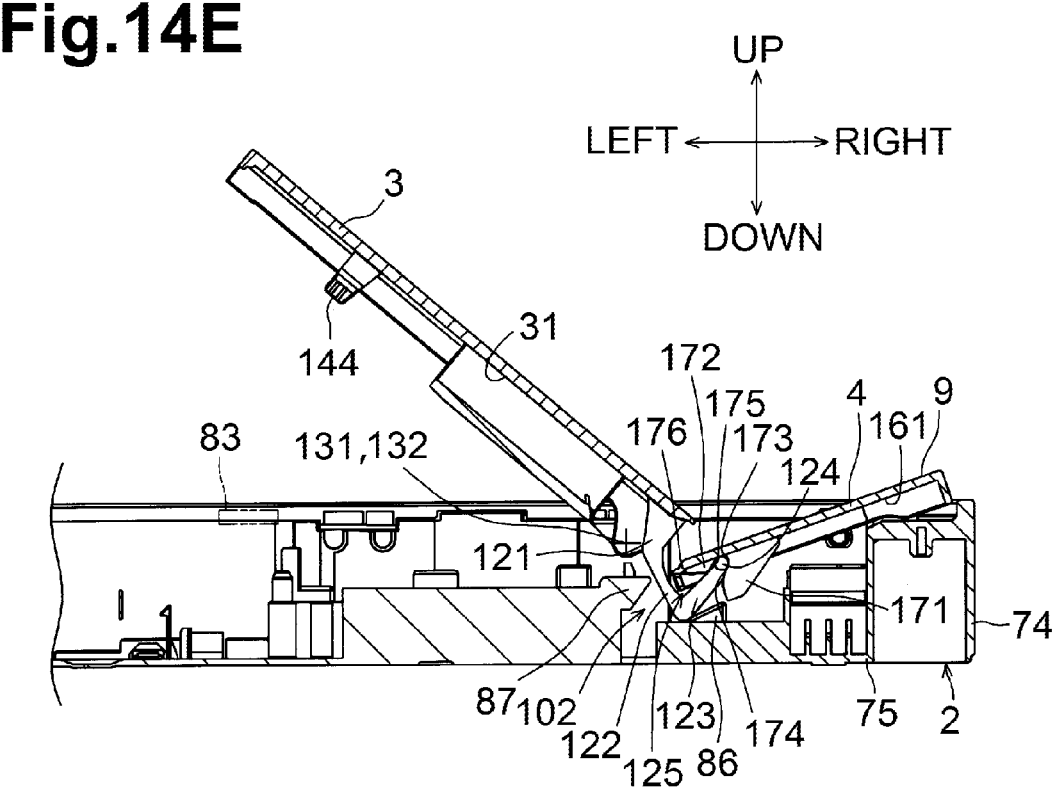
FIG. 14E is a sectional view of the right end portion of the image reading device in the illustrative embodiment according to one or more aspects of the disclosure, wherein the locations of the shafts and the boss are depicted in a state where the first cover is located at a position closer to the tray position than the position of the first cover located in FIG. 14D.

As the first cover 3 pivots to a predetermined inclination angle, as depicted in the example embodiments of FIG. 14E, the first cover 3 may move downward by its own weight and thus the shafts 131 and 132 may move to the lower ends of the grooves 81, respectively. Thereafter, the shafts 131 and 132 may stay on the lower ends of the grooves 81, respectively, until the first cover 3 moves back toward the tray position.

Figure 14F:
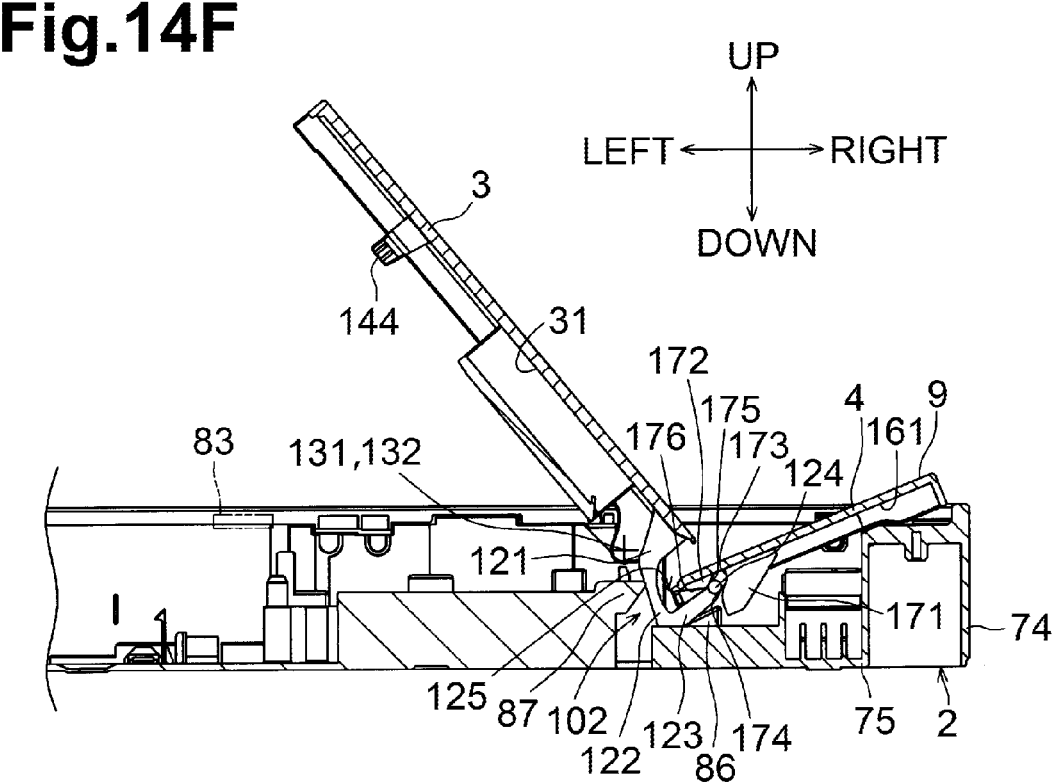
FIG. 14F is a sectional view of the right end portion of the image reading device in the illustrative embodiment according to one or more aspects of the disclosure, wherein the locations of the shafts and the boss are depicted in a state where the first cover is located at a position closer to the tray position than the position of the first cover depicted in FIG. 14E.

In accordance with the further movement of the first cover 3, as depicted in the example embodiments of FIG. 14F, the bosses 114 and 124 may move away from the pressed portions 174 of the acting portions 171, respectively.

Figure 14G:
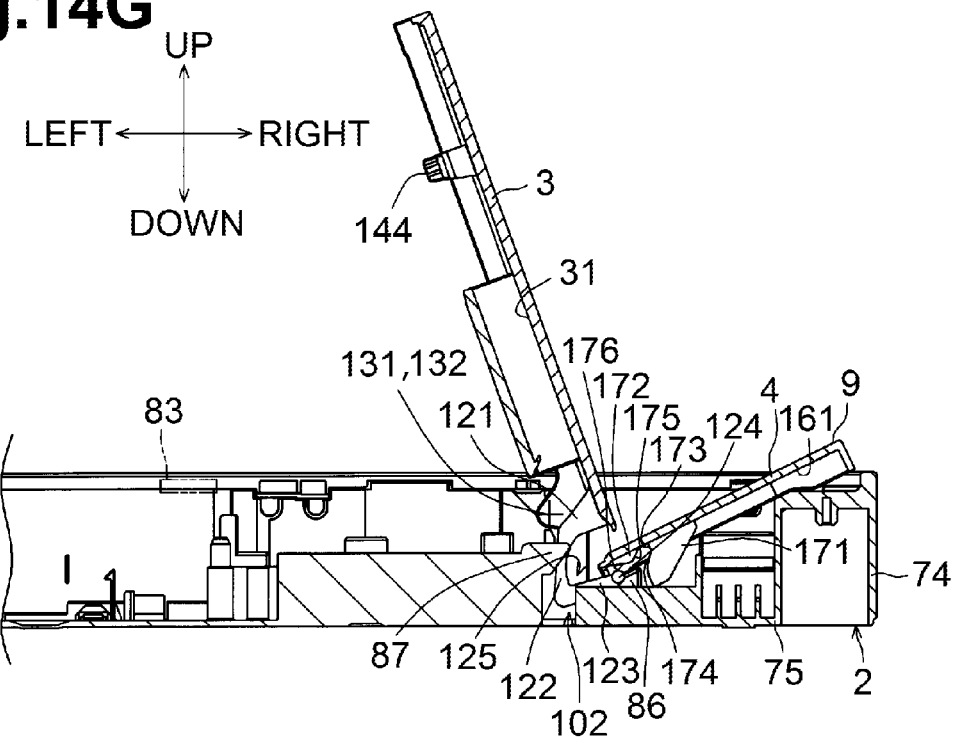
FIG. 14G is a sectional view of the right end portion of the image reading device in the illustrative embodiment according to one or more aspects of the disclosure, wherein the locations of the shafts and the boss are depicted in a state where the first cover is located at a position closer to the tray position than the position of the first cover depicted in FIG. 14F.

As depicted in FIG. 14G, as the bosses 114 and 124 separate from the first inclined surfaces 175 of the lead-in portions 172, respectively, the second cover 4 may move downward by its own weight. Then, the second cover 4 may come into contact with the contact portion 86 of the housing 2, thereby restricting a further movement of the second cover 4. Accordingly, the second cover 4 may be retained at the lower position.

Figure 14H:
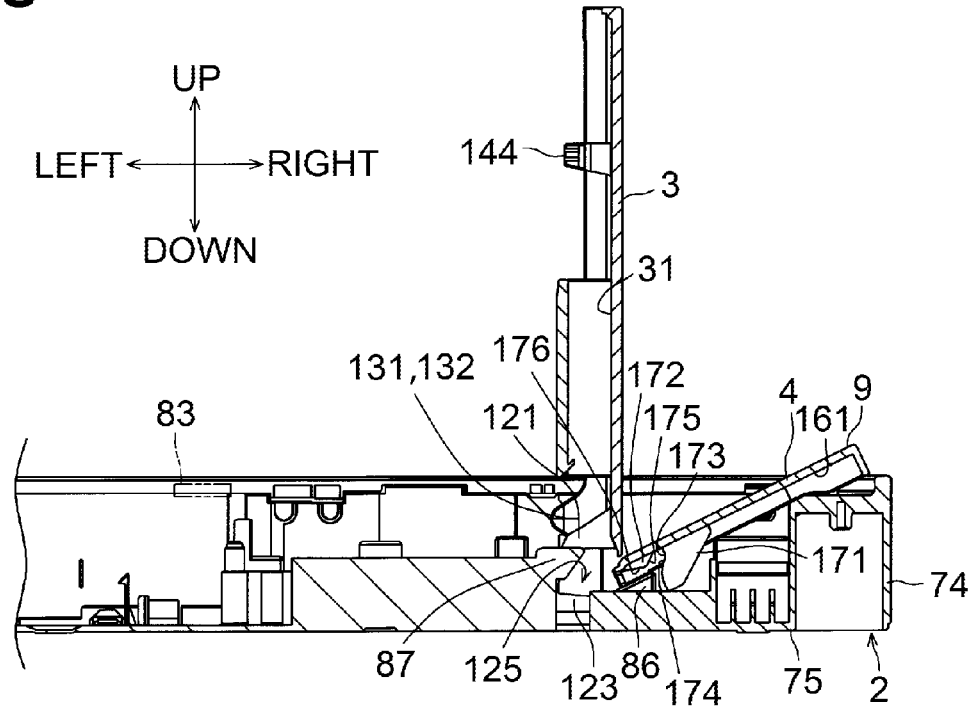
FIG. 14H is a sectional view of the right end portion of the image reading device in the illustrative embodiment according to one or more aspects of the disclosure, wherein the locations of the shafts and the boss are depicted in a state where the first cover is located at a position closer to the tray position than the position of the first cover depicted in FIG. 14G.
Figure 14I:
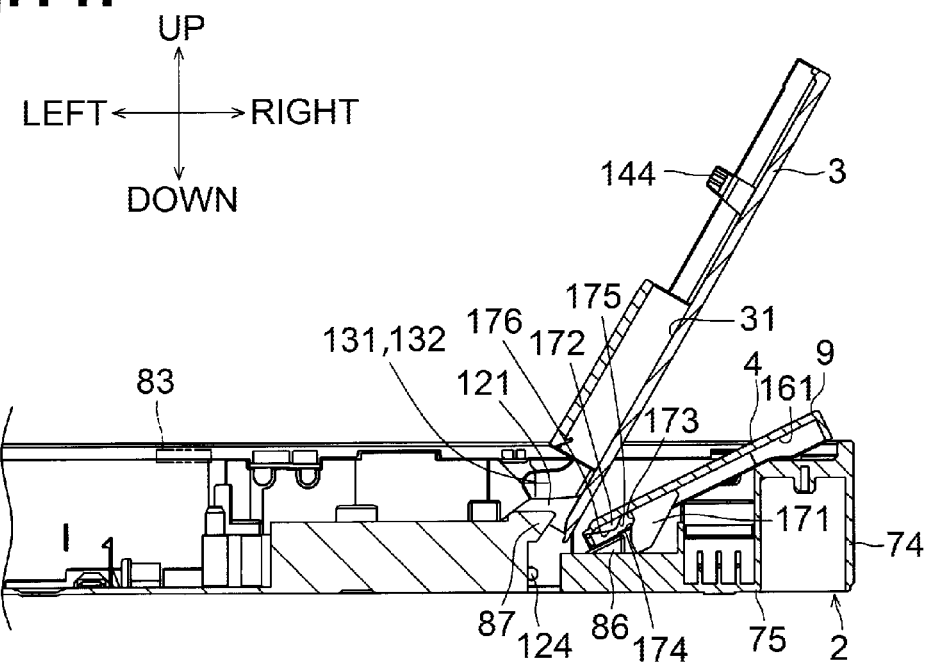
FIG. 14I is a sectional view of the right end portion of the image reading device in the illustrative embodiment according to one or more aspects of the disclosure, wherein the locations of the shafts and the boss are depicted in a state where the first cover is located at a position closer to the tray position than the position of the first cover depicted in FIG. 14H.
Figure 14J:
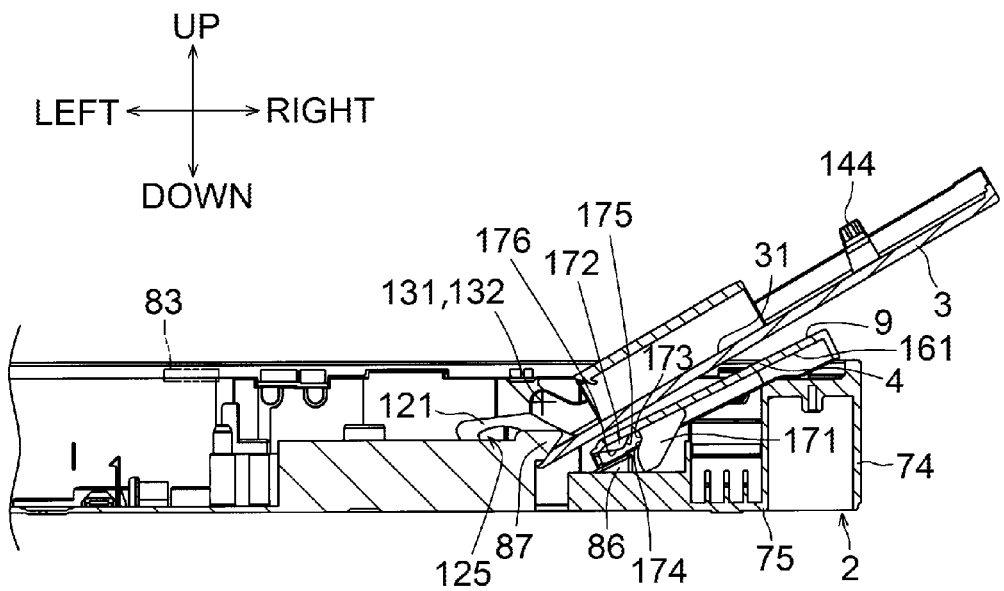
FIG. 14J is a sectional view of the right end portion of the image reading device in the illustrative embodiment according to one or more aspects of the disclosure, wherein the locations of the shafts and the boss are depicted in a state where the first cover is located at the tray position and the second cover is located at the lower position.

Thereafter, as the first cover 3 reaches the tray position by the further pivoting as depicted in the example embodiments of FIGS. 14H and 14I, the right end portion of the first cover 3 may come into contact with the stopper 87 of the housing 2 from below as depicted in FIG. 14J. The contact of the right end portion of the first cover 3 and the stopper 87 of the housing 2 may restrict a further movement of the first cover 3. Accordingly, the first cover 3 may be retained at the tray position.

As the first cover 3 moves to a position depicted in FIG. 14F from the tray position toward the cover position, the bosses 114 and 124 may come into contact with the first inclined surfaces 175 of the lead-in portions 172, respectively. It may be conceivable that the first cover 3 may be deviated to an upper left position from a proper position with respect to the second cover 4 by the movement of the shafts 131 and 132 toward upper left within the respective grooves 81 due to an application of an upward force to the first cover 3 at that time. In this case, also, during the pivoting of the first cover 3, the bosses 114 and 124 may come into contact with the second inclined surfaces 176 of the lead-in portions 172, respectively, and then move along the respective second inclined surfaces 176. Thus, the bosses 114 and 124 may be guided onto the respective first inclined surfaces 175.

Thereafter, in accordance with a further pivoting of the first cover 3, the first inclined surfaces 175 may press the bosses 114 and 124, respectively, whereby the bosses 114 and 124 may be led into the respective positions, each of which may be defined between one of the first inclined surfaces 175 and one of the pressed portions 174. Then, the bosses 114 and 124 may move toward the respective wall portions 173 and thus the first cover 3 may move toward the second cover 4. In accordance with a further movement of the first cover 3 after the bosses 114 and 124 contact the lower surface 161 of the second cover 4, the left end portion of the second cover 4 may be lifted.

As the first cover 3 reaches the cover position, the second cover 4 may be located at the higher position and the upper surface 5 of the first cover 3, the upper surface 7 of the fixed cover 6, and the upper surface 9 of the second cover 4 may constitute the device upper surface 8 that may be flat. Before the first cover 3 reaches the cover position, the projecting portion 143 of the stopper protrusion 141 and the projecting portion 144 of the stopper protrusion 142 may come into contact with the respective stopper portions 83. Then, in accordance with the movement of the first cover 3 toward the cover position, the stopper protrusions 141 and 142 may be deformed elastically. As the first cover 3 reaches the cover position, the projecting portions 143 and 144 may be caught by the respective stopper portions 83 in the engaged state.

<Effects>

As described above, the first cover 3 may be configured to be movable between the tray position and the cover position. In a state where the first cover 3 is located at the cover position, it may be impossible to place a sheet S on the discharged-sheet support surface 31, and the upper surface 5, which may be opposite to the discharged-sheet support surface 31 in the first cover 3, may constitute the upper cover serving as the device upper surface 8. Accordingly, the first cover 3 located at the closed position may prevent or reduce an entry of dust into the inside of the housing 2.

In a state where the first cover 3 is located at the cover position, the pre-fed sheet support portions 34 and 35 may be located below the first cover 3. In a state where the first cover 3 is located at the tray position, the pre-fed sheet support portions 34 and 35 may be disposed above the discharged-sheet support surface 31 of the first cover 3 while clearance is left between the pre-fed sheet support portions 34 and 35 and the discharged-sheet support surface 31. In a state where the first cover 3 is located at the tray position, the pre-fed sheet support portions 34 and 35 may be exposed as well as the discharged-sheet support surface 31 of the first cover 3. Therefore, in the state where the first cover 3 is located at the tray position, the pre-fed sheet support portions 34 and 35 may allow one or more sheets S to be placed thereon and the discharged-sheet support surface 31 disposed below the pre-fed sheet support portions 34 and 35 may also allow the one or more sheets S to be placed thereon in the first cover 3.

When the first cover 3 moves from the cover position to the tray position, the pre-fed sheet support portions 34 and 35 may be exposed. Thus, the pre-fed sheet support portions 34 and 35 may become available for use. Accordingly, without an interlock mechanism, the pre-fed sheet support portions 34 and 35 may be changed to the available state in accordance with the movement of the first cover 3 from the cover position to the tray position.

The pre-fed sheet support portions 34 and 35 may move integrally with the first cover 3 but not move in synchronization with the movement of the first cover 3. Therefore, operating noise might not occur due to the movement of the pre-fed sheet support portions 34 and 35 in synchronization with the first cover 3.

In a state where the first cover 3 is located at the tray position, the upper surfaces of the left end portions of the pre-fed sheet support portions 34 and 35 may be located at the higher level than the right end portion of the pre-fed-sheet mount surface 13. That is, in the conveyance direction of the sheet S on the pre-fed sheet support portions 34 and 35 and the pre-fed-sheet mount surface 13, the upper surfaces of the end portions, which may be disposed closer to the pre-fed-sheet mount surface 13, of the pre-fed sheet support portions 34 and 35 located upstream of the pre-fed-sheet mount surface 13 may be located at the higher level than the end portion, which may be located closer to the pre-fed sheet support portions 34 and 35, of the pre-fed-sheet mount surface 13. Therefore, this configuration may keep a leading edge of a sheet S from getting caught in joints between the pre-fed sheet support portions 34 and 35 and the pre-fed-sheet mount surface 13 when the sheet S slides on the pre-fed sheet support portions 34 and 35 and the pre-fed-sheet mount surface 13 from the pre-fed sheet support portions 34 and 35 toward the pre-fed-sheet mount surface 13.

In a state where the first cover 3 is located at the tray position, the left end portion of the discharged-sheet support surface 31 of the first cover 3 may be located at the lower level than the right end portion of the discharged-sheet mount surface 21. That is, in the conveyance direction of the sheet S on the discharged-sheet mount surface 21 and the discharged-sheet support surface 31, the end portion, which may be located closer to the discharged-sheet support surface 31, of the discharged-sheet mount surface 21 located upstream of the discharged-sheet support surface 31 may be located at the higher level than the end portion, which may be located closer to the discharged-sheet mount surface 21, of the discharged-sheet support surface 31. Therefore, this configuration may keep the leading edge of the sheet S from getting caught in a joint between the first cover 3 and the discharged-sheet mount surface 21 when the sheet S moves from the discharged-sheet mount surface 21 toward the first cover 3.

The horizontal portion 14 of the pre-fed-sheet mount surface 13 may be lie at the level lower than the device upper surface 8. In a state where the first cover 3 is located at the cover position, the pre-fed sheet support portions 34 and 35 may be accommodated in the position where the pre-fed sheet support portions 34 and 35 may face the pre-fed-sheet mount surface 13. Therefore, the first cover 3 may define the device upper surface 8 that may be flat.

The discharged-sheet guide portions 32 and 33 may have the thickness in the front-rear direction. The pre-fed sheet support portions 34 and 35 may be supported by the corresponding discharged-sheet guide portions 32 and 33 with being in contact win the lower surfaces of the discharged-sheet guide portions 32 and 33. Therefore, this configuration may ensure the stable support of the pre-fed sheet support portions 34 and 35.

The pre-fed sheet support portions 34 and 35 may be attached to the respective discharged-sheet guide portions 32 and 33 independently. Each of the pre-fed sheet support portions 34 and 35 may have a relatively short dimension in the front-rear direction. Therefore, it may be easy to handle the pre-fed sheet support portions 34 and 35 and easy to attach the pre-fed sheet support portions 34 and 35 to the discharged-sheet guide portions 32 and 33, respectively.

In each of the pre-fed sheet support portions 34 and 35, the first insertion wall portion 152 may be inserted into the space defined by the first wall portion 91, the sixth wall portion 96, and the eighth wall portion 98 of the discharged-sheet guide portion 32 and may be held therebetween. In each of the pre-fed sheet support portions 34 and 35, the leftward extended portion of the second insertion wall portion 153 may be inserted into the space defined by the second wall portion 92 and the ninth wall portion 99 of the discharged-sheet guide portion 32 and may be held therebetween. Further, in each of the pre-fed sheet support portions 34 and 35, the rightward extended portion of the third insertion wall portion 154 may be inserted into the space defined by the second wall portion 92 and the seventh wall portion 97 of discharged-sheet guide portion 32 and may be held therebetween. Therefore, the pre-fed sheet support portions 34 and 35 may be positioned with respect to the front-rear direction. Further, this configuration may restrict the pivoting of the pre-fed sheet support portions 34 and 35 on the axis extending in the right-left direction, thereby reducing or preventing disengagement of the pre-fed sheet support portions 34 and 35 from the discharged-sheet guide portions 32 and 33 due to their pivoting.

To attach the pre-fed sheet support portions 34 and 35 to the respective discharged-sheet guide portions 32 and 33, the pre-fed sheet support portions 34 and 35 may be pressed into the respective discharged-sheet guide portions 32 and 33 in order to engage the protrusions 100 of their discharged-sheet guide portions 32 in the stopper holes 156 in the stopper wall portions 155, respectively. The engagement of the protrusions 100 of the discharged-sheet guide portions 32 with the stopper holes 156 of the stopper wall portions 155, respectively, may fasten the pre-fed sheet support portions 34 and 35 to the respective discharged-sheet guide portions 32 and 33. Thus, this engagement may reduce or prevent easy disengagement of the pre-fed sheet support portions 34 and 35 from the respective discharged-sheet guide portions 32 and 33.

The pre-fed sheet support portions 34 and 35 may be shorter than the first cover 3 in the right-left direction. Therefore, in a state where the first cover 3 is located at the cover position, this configuration may ensure space for accommodating the pre-fed sheet support portions 34 and 35 therein.

In a state where the first cover 3 is located at the tray position, the right ends of the pre-fed sheet support portions 34 and 35 may deviate toward the left with respect to the right end of the first cover 3. Therefore, the first cover 3 might not interfere with placement of one or more sheets S onto the pre-fed sheet support portions 34 and 35.

The pre-fed sheet support portions 34 and 35 may comprise the plurality of ribs 157 on their surfaces 151 facing the first cover 3. The plurality of ribs 157 may protrude toward the first cover 3 and extend in the right-left direction. Therefore, this configuration may reduce a contact area between the sheet S and the pre-fed sheet support portions 34 and 35 during conveyance of the sheet S on the first cover 3. Thus, the sheet S may be conveyed smoothly on the first cover 3.

The pre-fed sheet support portions 34 and 35 may be colored in color that may be different from the color of the first cover 3. Therefore, this configuration may allow the user to find the pre-fed sheet support portions 34 and 35 easily.

In a state where the first cover 3 is located at the cover position, the projecting portion 143 of the stopper protrusion 141 and the projecting portion 144 of the stopper protrusion 142 of the first cover 3 may be engaged in the respective stopper portions 83 of the housing 2. Therefore, this configuration may reduce or prevent a shake of the first cover 3 at the cover position due to vibrations caused in the housing 2.

<Variations>

Hereinabove, the illustrative embodiment of the disclosure has been described. The aspects of the disclosure may be implemented by other embodiments.

Figure 15:
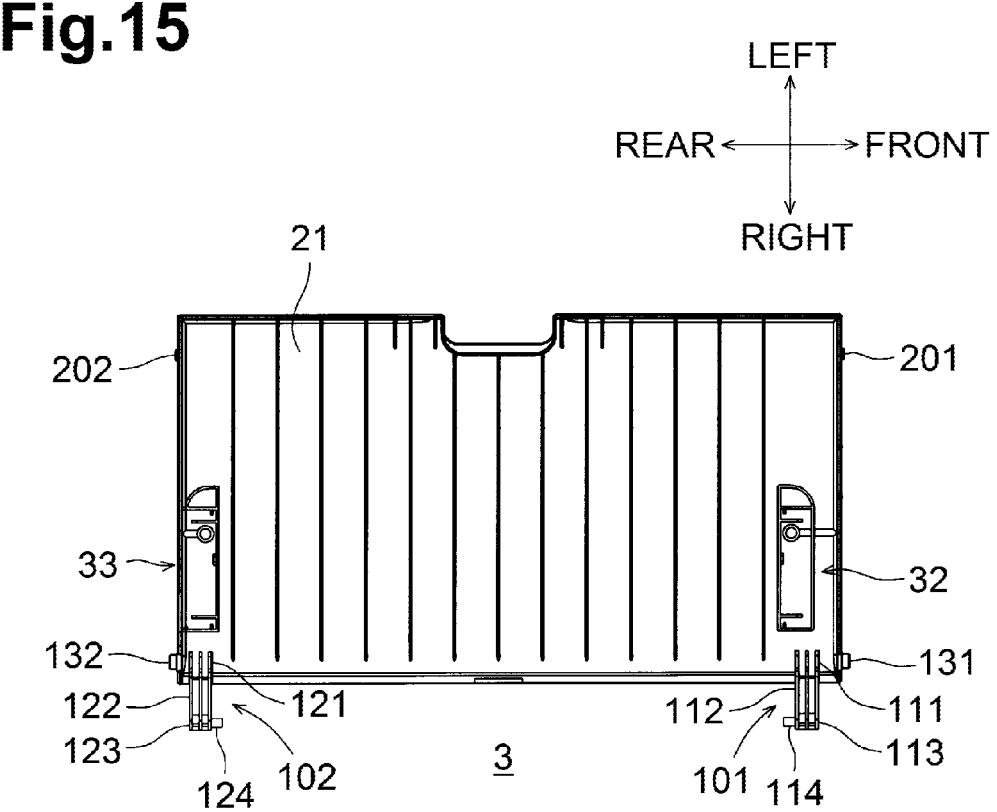
FIG. 15 depicts the discharged-sheet mount surface of the first cover in a variation of the illustrative embodiment according to one or more aspects of the disclosure.

In other embodiments, for example, instead of the stopper protrusions 141 and 142, as depicted in the example embodiment of FIG. 15, the first cover 3 may comprise stopper protrusions 201 and 202 on its front and rear end surfaces, respectively. In this case, as depicted in the example embodiment of FIG. 5, a stopper recess 203 as an example of a lock portion may be defined in the inner surface of the rear side-plate 72. The stopper recess 203 may be recessed rearward. Likewise, another stopper recess 203 (not depicted) as another example of the lock portion may be defined in the inner surface of the front side-plate 71, and the front stopper recess 203 and the rear stopper recess 203 may be symmetric with respect to a line extending in the front-rear direction. In a state where the first cover 3 is located at the cover position, the stopper protrusions 201 and 202 may be engaged in the stopper recesses 203, respectively, defined in the housing 2. This engagement may retain the first cover 3 at the cover position, thereby reducing or preventing a shake of the first cover 3 at the cover position.

The aspects of the disclosure may be applied to another image reading device. The image reading device may comprise a pre-fed-sheet mount portion, on which one or more pre-fed sheets S may be placed, and a discharged-sheet mount portion, on which one or more discharged sheets S may be placed. The discharged-sheet mount portion may be disposed above the pre-fed-sheet mount portion. In the image reading device, a sheet S may be conveyed upward from the pre-fed-sheet mount portion to the discharged-sheet mount portion.

While the disclosure has been described in detail with reference to the specific embodiments thereof, various changes, arrangements and modifications may be applied therein without departing from the spirit and scope of the disclosure.

What is claimed is:
1. An image reading device comprising:
a housing defining a conveying path;
a reading unit positioned along the conveying path;
a first support portion comprising a plurality of plate members;
a second support portion comprising a plurality of guide portions;
wherein the first support portion is positioned at a first end of the conveying path;
wherein the second support portion is positioned at a second end of the conveying path opposite to the first end; and wherein the second support portion comprises first and second surfaces, the first and second surfaces positioned opposite to each other, wherein the first and second support portions are pivotable together between first and second positions thereby maintaining a relative orientation of the first and second support portions, wherein in the first position the first support portion and the first surface are sheet support surfaces positioned to support a sheet that is conveyed along the conveying path and at opposing ends of the conveying path, and in the second position the second surface is an upper cover of the image reading device, wherein each of the plurality of guide portions protrudes from the first surface of the second support portion and includes an end portion, and each of the plurality of plate members is positioned above the first surface and extends from the end portion of the guide portion in a direction parallel to a rotational axis of the second support portion, and wherein each of the plurality of plate members is attached to a corresponding one of the plurality of guide portions.

2. The image reading device according to claim 1, further comprising a first sheet mount surface, wherein one of the first sheet mount surface and the first support portion is located upstream from the other of the first sheet mount surface and the first support portion in a conveyance direction, wherein an end portion of the first sheet mount surface is located adjacent to an end portion of the first support portion, wherein an upper surface of the end portion of the upstream one of the first sheet mount surface and the first support portion is located at a position forward of an upper surface of the end portion of the downstream one of the first sheet mount surface and the first support portion in a direction that is perpendicular to and extending from at least one of the sheet support surfaces.

3. The image reading device according to claim 2, wherein the first sheet mount surface is positioned below an upper edge of the housing of the image reading device, and wherein the first support portion is movable between first and second positions, the first support portion positioned below the upper edge of the housing and above the first sheet mount surface when the first support portion is in the second position.

4. The image reading device according to claim 1, further comprising a second sheet mount surface, wherein one of the second sheet mount surface and the second support portion is located upstream from the other of the second sheet mount surface and the second support portion in a conveyance direction, wherein an end portion of the second sheet mount surface is located adjacent to an end portion of the second support portion, wherein an upper surface of the end portion of the upstream one of the second sheet mount surface and the second support portion is located at a position forward of an upper surface of the end portion of the downstream one of the second sheet mount surface and the second support portion in a direction that is perpendicular to and extending from at least one of the sheet support surfaces.

5. The image reading device according to claim 1, wherein the guide portion has a first wall and a second wall, the first wall and the second wall spaced apart to form a width; and
wherein the plate member is supported by the first wall and the second wall.

6. The image reading device according to claim 1, wherein each of the plurality of plate members has a held portion; and
wherein each of the plurality of guide portions has a holding portion for supporting the held portion.

7. The image reading device according to claim 1, wherein each of the plurality of plate members is press-fitted in the corresponding one of the plurality of guide portions, and the plate member is press-fit in a direction orthogonal to the first surface of the second support portion.

8. The image reading device according to claim 1, wherein the first support portion has a length shorter than a length of the second support portion in a direction along the conveying path.

9. The image reading device according to claim 1, wherein in the first position, an upstream end of the first support portion is located more downstream than an upstream end of the second support portion.

10. The image reading device according to claim 1, wherein the first support portion comprises first and second surfaces, the first and second surfaces positioned opposite to each other, and the first surface is the sheet support surface, the second surface has a rib protruding toward the second support portion, wherein in the first position, the second surface of the first support portion is positioned above the first surface of the second support portion.

11. The image reading device according to claim 1, wherein the first support portion is a color that is different from a color of the first surface of the second support portion.

12. The image reading device according to claim 1, further comprising a lock portion for locking the second support portion in the second position.

13. The image reading device according to claim 1, wherein the first end of the conveying path defines a sheet feeding portion and the second end of the conveying path defines a discharge portion of the image reading device.

14. An image reading device comprising:
a housing defining a conveying path;
a reading unit positioned along the conveying path;
a support portion having a cover surface and an opposing first support surface, the support portion pivotable between open and closed positions about an axis orthogonal to a conveying direction, wherein in the closed position, the cover surface is an upper cover of the image reading device and in the open position the opposing first support surface forms a sheet support surface at an end of the conveying path;
a second support portion pivotable between open and closed positions in the same direction as the first support surface, wherein, in the open position, the second support portion forms a second sheet support surface at an opposite end of the conveying path from the first support surface, the first and second sheet support surfaces positioned at opposite ends of the conveying path to support a sheet that is conveyed along the conveying path;
wherein the support portion includes a plurality of guide portions each protruding from the opposing first support surface and including an end portion;
wherein the second support portion includes a plurality of plate members each positioned above the opposing first support surface in the open position and extending from the end portion of the guide portion in a direction parallel to a rotational axis of the second support portion,
wherein each of the plurality of plate members is attached to the corresponding one of the plurality of guide portions, and
wherein in the closed position, the second support portion is positioned below the support portion.

15. The image reading device according to claim 14, wherein the second support portion is pivotable about the axis.

16. The image reading device according to claim 14, wherein the second support portion is attached to the first support surface, thereby maintaining relative positions of the first support surface and the second support portion.

\* \* \* \* \*